United States Patent
Gros et al.

(10) Patent No.: US 9,695,322 B2
(45) Date of Patent: Jul. 4, 2017

(54) PROCESS FOR THE COATING OF METALLIC SURFACES, COATING COMPOSITION, AND COATINGS PRODUCED IN SUCH A WAY

(76) Inventors: Georg Gros, Oppenau (DE); Stefan Waidelich, Oppenau (DE); Norbert Maurus, Langen (DE)

( * ) Notice: Subject to any disclaimer, the term of this patent is extended or adjusted under 35 U.S.C. 154(b) by 90 days.

(21) Appl. No.: 13/344,642

(22) Filed: Jan. 6, 2012

(65) Prior Publication Data

US 2012/0103511 A1    May 3, 2012

Related U.S. Application Data

(63) Continuation of application No. 12/938,584, filed on Nov. 3, 2010, now abandoned, which is a continuation of application No. 10/540,721, filed as application No. PCT/EP2004/000108 on Jan. 9, 2004, now abandoned.

(30) Foreign Application Priority Data

Jan. 11, 2003 (DE) .................................. 103 00 751

(51) Int. Cl.
| | | |
|---|---|---|
| C08F 2/48 | (2006.01) | |
| B29C 59/00 | (2006.01) | |
| C08F 2/50 | (2006.01) | |
| B05D 3/10 | (2006.01) | |
| B05D 5/12 | (2006.01) | |
| B05D 3/12 | (2006.01) | |
| C09D 5/08 | (2006.01) | |
| C08F 251/02 | (2006.01) | |
| C09D 4/06 | (2006.01) | |

(52) U.S. Cl.
CPC ............ *C09D 5/086* (2013.01); *C08F 251/02* (2013.01); *C09D 4/06* (2013.01); *Y10T 156/10* (2015.01)

(58) Field of Classification Search
CPC .......... B05D 3/067; C09D 4/06; C09D 5/086
USPC .... 427/421.1, 428.01, 430.1, 493, 508, 517, 427/519
See application file for complete search history.

(56) References Cited

U.S. PATENT DOCUMENTS

| | | | |
|---|---|---|---|
| 5,002,975 A | 3/1991 | Bartoszek-Loza et al. | |
| 5,069,929 A | 12/1991 | Arai et al. | |
| 5,103,550 A * | 4/1992 | Wefers et al. | ............... 29/527.4 |
| 5,204,143 A * | 4/1993 | Nishimiya et al. | ........... 427/387 |
| 5,726,225 A | 3/1998 | Braig et al. | |
| 6,211,262 B1 | 4/2001 | Lungu et al. | |
| 6,893,687 B2 | 5/2005 | Maurus | |
| 2004/0013815 A1 | 1/2004 | Gros | |

FOREIGN PATENT DOCUMENTS

| | | |
|---|---|---|
| DE | 196 23 268 A1 | 12/1996 |
| DE | 19925631 A | 12/2000 |
| DE | 100 22 352 A1 | 11/2001 |
| DE | 103 00 751 A1 | 7/2004 |
| EP | 0175035 A | 3/1986 |
| WO | WO-02/24820 A2 | 3/2002 |

\* cited by examiner

*Primary Examiner* — Dah-Wei D Yuan
*Assistant Examiner* — Kristen A Dagenais

(57) ABSTRACT

A process for coating a metallic surface of a metallic substrate comprising applying, an organic, anionically, cationically or radically curable anticorrosive composition, to the metallic surface, wherein said anticorrosive composition is a dispersion or solution containing at least two components that are at least partially anionically, cationically or radically curable, wherein at least one monofunctional monomer or monofunctional oligomer is present, a photoinitiator, and first organic corrosion inhibitor.

75 Claims, No Drawings

PROCESS FOR THE COATING OF METALLIC SURFACES, COATING COMPOSITION, AND COATINGS PRODUCED IN SUCH A WAY

This is a continuation of U.S. Serial No. 12/938,584 filed Nov. 3, 2010 (now abandoned), hereby incorporated by reference for all purposes, which is a continuation of U.S. Ser. No. 10/540,721 filed Mar. 28, 2006, (abandoned) which is a §371 of PCT/EP2004/000108 filed Jan. 9, 2004, and claims priority from German Patent Application 103 00 751.2 filed Jan. 11, 2003.

FIELD OF THE INVENTION

The invention concerns a process for the coating of metallic surfaces with an organic anticorrosive composition, the anticorrosive composition and the coatings produced in such a way.

BACKGROUND OF THE INVENTION

Metallic strips, sheets and formed parts are produced in very large numbers and must be protected against corrosion. In certain production processes, however, metallic substrates coated with at least one paint film have the disadvantage of displaying inadequate corrosion protection if the coatings are thinner than 30 μm, for example. To date, to the knowledge of the applicant, no adequate corrosion-resistant high-speed coating process for coating with a single thin, polymeric, chromate-free, corrosion-resistant coating is known which allows adequate corrosion protection.

Furthermore, to the knowledge of the applicant there is to date no so-called pretreatment primer in industrial use, wherein a thin, e.g. 5 to 15 μm thick, paint film or a thin, paint-like organic film having elevated corrosion resistance is applied directly to the metallic surface without the application below it of a pretreatment coating or a similar coating, in particular for increasing paint adhesion and corrosion protection.

DE-A1-196 23 268 describes a powder coating composition wherein a comparatively high content of an organic corrosion inhibitor is used together with an inorganic corrosion inhibitor.

OBJECTS AND SUMMARY OF THE INVENTION

The object was therefore to propose an anticorrosive composition which is low in or free from water or organic solvent (so-called "100% system") and which is of particularly high quality with regard to paint adhesion and corrosion protection or is even of such high quality that in many applications the interposition of a pretreatment coating can be dispensed with, for which reason in the latter case this anticorrosive composition can also be described as a pretreatment primer. The anticorrosive composition should if possible be able to be used for many purposes and on a mass scale and be as inexpensive as possible. It would be advantageous here to be able to reduce the content of particularly expensive corrosion inhibitors and other expensive components. The anticorrosive coating produced in this way should be readily formable together with the metallic substrate and with the at least one further paint film that is optionally additionally applied to it, and it should display good corrosion protection and good paint adhesion even after forming. It is desirable here that as many of these properties as possible are also obtained from thin films having a dry film thickness in the range from 4 to 12 μm in particular and optionally also, where the anticorrosive requirements are lower, having a dry film thickness in the range from 1 to 4 μm. It is also preferable if the anticorrosive composition is suitable for a high-speed coating of metallic strips.

The anticorrosive composition should where possible be able to fulfil at least some of the following requirements, firstly as an anticorrosive coating applied on top of at least one pretreatment coat and secondly despite dispensing with all pretreatment coats, in each case as an organic thin-film coating having a dry film thickness in the range from 0.4 to 20 μm and preferably below 10 μm:

1. That the corrosion resistance of conventional primer coatings is successfully maintained at least at around the same level or is even markedly increased, wherein the corrosion resistance, depending on the area of application, should be resistant for 100 h or 150 h in the salt spray test to DIN 50021;
2. that the adhesion of the anticorrosive coating is successfully increased to such an extent that the pretreatment coat, which is otherwise also used above all to increase the adhesion of the paint film to the substrate, can be dispensed with;
3. that the flexibility of the anticorrosive coating is successfully increased, e.g. to values of ≤T3, ≤T2 or ≤T1 in the T-bend test to ECCA standard T7, where possible to such an extent that with a dry film thickness in the range from 0.4 to 20 μm it displays a very much greater flexibility than a conventional primer coating of typically today at most around 5 to 20 μm, particularly as until now a value of T0 has not been determined or to the knowledge of the applicant described for any 100% UV system;
4. that the elasticity and bond strength of the primer coating are successfully increased significantly, so that it displays a much higher elasticity and bond strength, determined by the indentation in mm according to DIN EN ISO 1520, than a conventional primer coating;
5. that the surface-slip and forming properties of the anticorrosive coating are successfully developed to such an extent that in the forming of metal sheets by cup drawing it is free from abrasion and striation;
6. that the chemical resistance of the anticorrosive coating is successfully increased so that it displays a much higher chemical resistance than is usual in a conventional primer coating of typically today at most <10 MEK cycles, where possible 60 cycles, or/and
7. that the embrittlement of the anticorrosive coating applied to the metallic surface, relative to the behaviour a few days after application or crosslinking, is successfully minimised, so that the coating displays a very much lower embrittlement—determined by the T-bend test≤T1 after accelerated ageing—than a primer coating, which continues to postcure after irradiation and is also known to become brittle in this process.

Surprisingly it was established that even with such thin films with a dry film thickness in the range from 4 to 8 μm, a highly corrosion-resistant coating can be obtained, even if no pretreatment coat has been applied to the steel sheets coated with hot-galvanised zinc and the anticorrosive coating is applied directly to the hot-galvanising coat: in the salt spray test over 250 h, even without the interposition of a pretreatment coat, the subsurface migration at the scratch was less than 2 mm. Such a corrosion resistance in a paint film applied directly to the hot-galvanising coat is unknown to the applicant either from practical experience or from the literature.

The object is achieved with a process for coating surfaces of metallic substrates, in particular of parts, profiles or/and strips, preferably those based on aluminium, magnesium or/and steel, which are optionally precoated with at least one metallic coating such as e.g. a zinc layer or with at least one zinc-containing alloy layer, with an organic, anionically, cationically or/and radically curable anticorrosive composition, which is characterised in that the anticorrosive coating is a dispersion or solution containing at least two components selected from the group of monomers, oligomers and polymers with a total content in the range from 50 to 95 wt. %, which are least partially anionically, cationically or/and radically curable, wherein a content of at least one monofunctional monomer or/and oligomer in the range from 1 to 58 wt. % is included herein, wherein the anticorrosive composition additionally contains at least one photoinitiator for anionic, cationic or/and radical crosslinking with a content in the range from 0.5 to 22 wt. %, if electron beam radiation is not used, together with a first organic corrosion inhibitor in particular with a content in the range from 0.05 to 6 wt. %, optionally at least one further organic or/and inorganic corrosion inhibitor with a total content in the range from 0.1 to 12 wt. %, optionally at least one hardener for a chemical postcure with a content in the range from 0.05 to 8 wt. %, optionally up to 35 wt. % of additive(s) such as e.g. additives for substrate wetting such as in particular for bonding to electrodeposition coatings, wetting agents, defoaming agents, lubricants, bonding agents, pigments, flow control agents or/and agents to increase reactivity, surface additives to increase scratch resistance, thixotropic auxiliary agents, and optionally water or/and at least one organic solvent in a total content of 0.01 to 5 wt. %, relative in each case to the solids contents in wt. %, wherein the anticorrosive composition is applied to the metallic surfaces in a wet film thickness in the range from 0.5 to 25 μm, optionally dried and is then anionically, cationically or/and radically cured to form an anticorrosive coating, wherein the cured anticorrosive coating displays a dry film thickness in the range from 0.4 to 20 μm.

The cured anticorrosive coating preferably displays a flexibility and bond strength of ≤T3, in particular of ≤T2 or even of ≤T1, determined by means of a T-bend test in accordance with ECCA standard T7 on hot-galvanised steel sheets of 0.3 mm thickness organically coated in a film thickness of 8 μm.

DETAILED DESCRIPTION

The anticorrosive composition according to the invention is preferably a so-called 100% UV system, which is largely or entirely free from water or/and from organic solvent. Amounts of up to 5 wt. % water or/and of up to 5 wt. % organic solvent are preferred here, in particular amounts of up to 3 wt. % water or/and of up to 3 wt. % organic solvent, with amounts of up to 1 wt. % water or/and of up to 1 wt. % organic solvent being particularly preferred, because the time and effort required for drying are so much reduced and because the coating that is formed can—if necessary—be excited to cure and be cured by exposure to radiation more quickly or closer to the area in which the polymeric mixture is applied. A strip, for example, with the coating according to the invention can then—if necessary—be excited to cure and be cured by exposure to actinic radiation more quickly or closer to the area in which the anticorrosive composition is applied.

Actinic radiation is understood to be radiation whose energy, frequency or applied dosage is suitable for activation of the polymerisation initiator (=photoinitiator) or is sufficient for an extensive or as complete as possible a polymerisation. It should normally have at least the energy or the frequency of visible light or UV light. Short-wave visible or/and ultraviolet light (UV light) is preferred. Any radiation having a shorter wavelength, in other words a higher energy, is naturally likewise suitable. Thus electron beam radiation can also be used, for example, whereby there may even be no need to use a photoinitiator. If free radicals are released, the chemical reactions triggered by the actinic radiation are also described as radical curing or radical crosslinking or UV curing, wherein within the meaning of this application UV curing is intended to include curing with any type of actinic radiation. Anionic, cationic or/and radical curing preferably takes place in the temperature range from 12 to 200° C., particularly preferably at 15 to 140° C., in particular at temperatures in the range from room temperature to 70° C.

The coating mixture according to the invention can include a content of at least one compound forming free radicals under the influence of actinic radiation (so-called photoinitiator), wherein the total content of free-radical-forming compounds can in particular be in the range from 3 to 15 wt. %, relative to the dry matter. Their total content is preferably in the range from 4 to 14 wt. %, particularly preferably in the range from 5 to 13 wt. %, most particularly preferably in the range from 6 to 12 wt. %. In order to obtain the highest reactivities and MEK resistances, however, this range can be raised by up to 4 wt. %, in other words from 8 to 18 wt. %, for example. Under the influence of actinic radiation, in particular of UV radiation, the at least one photoinitiator forms free radicals, which react with the radically polymerisable binder and crosslink it partially or completely during and possibly for a short period after actinic irradiation. The radically polymerisable compounds have unsaturated polymerisable groups which react with the groups formed from the photoinitiators due to radiation initiation and can form a water-insoluble network. After this chemical reaction this binder may still display reactive groups such as OH and polyol groups, which can limit the chemical resistance and corrosion resistance of the coating formed therefrom.

The polymeric mixture is preferably made particularly reactive by means of elevated contents of at least one photoinitiator, in particular in order to obtain a fast(er) or/and as extensive a full cure as possible. For good chemical resistance in particular, adequate basic crosslinking is generally required. As an alternative or in addition, the radiation dosage can be increased or/and a more reactive anionically, cationically or/and radically curing polymer can be used. A high degree of crosslinking is quickly achieved in this way, and in particular also a full crosslinking.

The anticorrosive composition preferably contains water or/and at least one organic solvent in a total content of only up to 2.5 wt. %, particularly preferably only up to 1.5 wt. %, most particularly preferably only up to 0.8 wt. %, in particular of less than 0.5 wt. %, above all of less than 0.3 or less than 0.15 wt. %, relative in each case to solids contents in wt. %. The total content of water or/and at least one solvent is preferably 0.02 to 4.5 wt. %, particularly preferably 0.025 to 4 wt. %, most particularly preferably at least 0.03 wt. % and up to 3.5 wt. %, in particular at least 0.05 wt. % and up to 3.2 wt. %. Particularly preferably suitable as organic solvents are low-viscosity solvents not subject to labelling requirements, such as alcohols, or esters, ketones, glycol ethers or/and aromatic hydrocarbons, such as e.g. xylene, in particular propylene glycol ether.

It is preferable for the anticorrosive composition to be largely free from organic solvent. It is also preferable for almost no or no water or/and no organic solvent to be added separately to the anticorrosive composition and for such contents optionally only to be added in order to adjust the viscosity of the anticorrosive composition, for example. At least one of the raw material components conventionally contains a small or very small proportion of water or/and organic solvent. The liquid consistency of the anticorrosive composition according to the invention is preferably determined by the content, consistency and solubility characteristics of in particular the monomers or/and oligomers added for the polymers, which for that reason are also called reactive thinners. If a minimal amount of water or organic solvent is still present in the polymeric coating at the start of actinic irradiation, however, the formation of gas bubbles and the breaking up or/and warping of parts of the coating (known as blistering) can easily occur.

The compositions are therefore related to solids contents in wt. %, wherein contents of water or/and organic solvent exceed 100 wt. %.

The anticorrosive coating according to the invention preferably also acts as a pretreatment coat, such that the adhesion to the substrate of a primer coating according to the invention and the corrosion resistance must be therefore correspondingly high in order to obtain at least adequate results even without the pretreatment coat.

In the process according to the invention the anticorrosive coating when applied to the metallic substrate can preferably display a viscosity in the range from 80 to 20000 mPa·s, particularly preferably in the range from 150 to 15000 mPa·s, most particularly preferably in the range from at least 200 and up to 12000 mPa·s, in particular on metal strip in the range from 350 to 10000 mPa·s or in the range from 450 to 1200 mPa·s, measured at a temperature of 25° C. with a Haake VT 500 rotational viscometer with an MV DIN measuring cylinder in accordance with DIN 53019.

In the process according to the invention the anticorrosive composition can display a temperature in the range from 5 to 90° C. when applied, particularly preferably in the range from at least 15, 20 or 25° C. to 70 or 60° C., in particular in the range from 20 to 50° C.

In the process according to the invention the anticorrosive composition can preferably be applied to the metallic surface by pouring without or with a knife, spraying, atomisation, dipping or/and rolling.

In the process according to the invention, surfaces consisting of aluminium, aluminium-containing alloys, chromium, chromium alloys, magnesium alloys, stainless steels, steels, zinc, zinc-containing alloys, tin or/and tin-containing alloys can be coated.

In the process according to the invention a metallic strip can be coated at a belt speed in particular in the range from 20 to 220 m per minute, wherein the application device for the coating mixture or/and the device for actinic irradiation of the polymeric coating can be held in a fixed position. Nowadays many conveyor belt systems are operated at a speed in the range from 30 to 130 m/min. It is foreseeable, however, that in the future quite a few systems will be operated at a speed in the range from 80 to 200 m/min, in particular in the range from 100 to 180 m/min. Increasing the speed above 120 m/min in particular requires the reliable fulfillment of the particularly high demands on the system, on the automation of the process, on the quality of the mixtures used for coating and on process reliability. An elevated belt speed also requires particularly fast coating and crosslinking in order that the conveyor belt systems do not become too long.

In the process according to the invention the wet film of the anticorrosive composition can be applied in particular in a film thickness in the range from 0.45 to 22 μm, preferably in the range from 0.5 to 18 μm, particularly preferably in the range from 0.6 to 14 μm, particularly preferably from at least 0.8 μm and up to 10 μm, above all from at least 1 μm and up to 8 μm.

In the process according to the invention the wet film of the anticorrosive composition can be dried in particular at temperatures in the range from 30 to 95° C., particularly preferably in the range from 40 to 80° C., preferably by heating in an oven, inductive drying, IR irradiation, NIR (near infrared) irradiation or/and microwave irradiation.

In the process according to the invention the largely or completely dry film of the anticorrosive composition can be irradiated, preferably with electron beam radiation, other short-wave high-energy radiation, visible radiation or/and UV radiation, the latter in particular in the wavelength range from 180 to 700 nm, particularly preferably with emission maxima in the wavelength range from 200 to 600 nm, and partially, extensively or completely crosslinked in this way, in particular anionically, cationically or/and radically crosslinked. Simultaneous cationic and radical crosslinking with UV radiation is also preferred. Lamps which emit substantially in the short-wave visible range from around 400 to 550 nm can also be used. UV light sources such as gas discharge lamps, xenon lamps or sodium vapour lamps are preferably used as radiation sources. The lamp power here is often in the range from 100 to in future over 300 Watts/cm, preferably currently in the range from 160 to 240 Watts/cm. Irradiation can optionally also be performed here with extensive or complete oxygen exclusion, allowing improved energy efficiency and faster belt speeds. Higher-energy radiation, for example electron-beam radiation, can also be used in principle for curing. Just like the coating process, the actinic irradiation is preferably performed at ambient temperatures which are no higher or not substantially higher than room temperature, in other words generally no higher than around 65° C. The irradiated surface of the coating often reaches temperatures in the range from 50 to around 130° C. in this process due to UV excitation, which may display a proportion of IR radiation.

As an alternative or in addition to the radical crosslinking, polymerisation with at least one photoinitiator for anionic or/and cationic crosslinking, in particular for cationic crosslinking, can take place. Anionic or/and cationic crosslinking is understood to be a polymerisation wherein the at least one suitable photoinitiator is activated and decomposed due to irradiation e.g. with IR light, NIR (near infrared) light, visible light or/and UV light and wherein the decomposition products react with anionically or/and cationically polymerisable substance and increase the chain lengths. Heat energy can optionally also be introduced in addition in support of cationic crosslinking in particular. The reactions are usually somewhat slower than in radical crosslinking. Photoinitiators which can be used for this purpose are for example those such as diazonium, ferrocene, iodonium, sulfonium or/and thiapyrylium compounds, in particular salts—preferably aryl diazonium salts, diaryl iodonium salts, triaryl sulfonium salts—or those such as metallocene-like complex salts such as those based on a cyclopentadienyl compound, e.g. based on a cyclopentadienyl-aryl compound, and a fluorine complex containing boron, phosphorus, arsenic or antimony or based on a bis-cyclopentadienyl-iron derivative and e.g. a quinoid—which form Lewis or Brönsted acids under the influence of radiation. The presence of at least one sensitiser can be advantageous here. As anionically or/and cationically polymerisable substances, examples such as cyclic acetals, cyclic esters, cyclic ethers, cyclic organosiloxanes, cyclic sulfides, ethylene-unsaturated compounds; heterocyclic compounds, methylol compounds, vinyl monomers, vinyl prepolymers, epoxy resins or mixtures with at least one compound from these groups can be added, such as mixtures with aliphatic, cycloaliphatic, aromatic or/and heterocyclic epoxide, polyester, epoxidised polybutadiene, epoxy silanes, compounds containing epoxide groups, mixtures of epoxide with thermoplastic substance or epoxide-polyester mixtures, for example also epoxide group-containing monomers such as those based on glycidyl ethers of alcohols or epoxycyclohexyl derivatives. The content of photoinitiators for anionic or/and cationic crosslinking is in particular 0.1 to 5 wt. % of the content of anionically or/and cationically polymerisable substances, particularly preferably 0.8 to 3.5 wt. %. It is preferably in total 1 to 20 wt. % relative to the dry matter in the anticorrosive composition, particularly preferably 1.2 to 18 wt. % or 1.8 to 16 wt %, most particularly preferably 3 to 15 wt. %, in particular at least 3.5 wt. % and up to 12 wt. %, above all at least 4 wt. % and up to 11 wt. %, above all at least 5 and up to 9 wt. %.

In the process according to the invention the anticorrosive composition and the anionically, cationically or/and radically cured dry film produced therewith can contain at least one hardener for chemical crosslinking, such that the dry film, optionally after being heated to at least 60° C. or 80° C., is chemically postcured, preferably heated to temperatures in the range from 100 to 320° C., particularly preferably to temperatures in the range from 120 to 180° C.

In the process according to the invention the substrate coated with the anticorrosive coating can be coated with at least one further paint-like composition, with lacquer, paint or/and adhesive.

In the process according to the invention the anticorrosive coating applied to the metallic body can be formed with the substrate, in particular a metal sheet, wherein the anticorrosive coating remains largely or entirely undamaged, in spite of possibly extreme forming conditions.

In the process according to the invention, the formed substrate in the form of a formed, cut or/and stamped metal sheet coated with the anticorrosive coating can be joined to another construction element by gluing, welding or/and at least one other joining process.

In the process according to the invention the metallic surface can be cleaned or/and pickled before application of the pretreatment primer coat and optionally rinsed thereafter at least once with water or an aqueous solution.

In the process according to the invention the solution or dispersion can be applied to a metallic strip carried on a conveyor belt system, in particular to a strip coated with aluminium, with an aluminium-containing alloy or/and with at least one zinc-containing alloy, such as e.g. on the basis of AlSi, ZnAl such as Galfan®, AlZn such as Galvalume® or/and other Al alloys. If the aluminium- or/and zinc-containing coating has only just been applied to the metallic strip on the same belt system, in other words generally just a few seconds or minutes earlier, this coating is particularly reactive, and if it is coated immediately with the anticorrosive composition according to the invention it produces far better values for adhesion and resistance to chemicals and impact than if this coating can first oxidise at its surface, is oiled, is coated in any other way or/and can be contaminated.

The object is also achieved with a process for coating surfaces of metallic substrates—in particular of parts, profiles or/and strips, preferably those based on aluminium, magnesium or/and steel, which are optionally precoated with at least one metallic coating such as e.g. a zinc layer or with at least one zinc-containing alloy layer—with an organic, anionically, cationically or/and radically curing anticorrosive composition, which can also be characterised in that before coating with a first organic anticorrosive composition no pretreatment coat, such as e.g. one based on chromate, phosphate, complex fluoride, silane or/and siloxane, is applied to the metallic surface, that this anticorrosive composition is a dispersion or solution which is applied directly to the metallic surfaces in a wet film thickness in the range from 0.4 to 25 µm—preferably from 0.6 to 15 µm, particularly preferably from 0.8 to 10 µm, in particular from 1 to 8 µm, optionally dried and then anionically, cationically or/and radically cured to form an anticorrosive coating, wherein the cured film displays a dry film thickness in the range from 0.4 to 20 µm—preferably from 0.6 to 18 µm, particularly preferably from at least 0.8 and up to 12 µm, in particular from at least 1 and up to 8 µm, wherein the anticorrosive coating preferably achieves a flexibility and bond strength of T3, in particular of ≤T2 or even of ≤T1, determined by means of a T-bend test in accordance with ECCA standard T7 on hot-galvanised precoated steel sheets of 0.3 mm thickness organically coated in a film thickness of 8 µm. It is particularly desirable here for the anticorrosive coating according to the invention simultaneously also to act as the pretreatment coating, in other words to be applied directly to a metallic surface without the interposition of a pretreatment coat.

The object is likewise achieved with an organic, anionically, cationically or/and radically curable anticorrosive composition, which is characterised in that it is a dispersion or solution containing at least two components selected from the group of monomers, oligomers and polymers which are at least partially anionically, cationically or/and radically curable and are included in a content in the range from 50 to 95 wt. %, wherein a content of at least one monofunctional monomer or/and oligomer in the range from 1 to 58 wt. % is included herein and wherein the anticorrosive composition contains at least one photoinitiator for anionic, cationic or/and radical crosslinking with a content in the range from 0.5 to 22 wt. %, if electron beam radiation is not used, together with a first organic corrosion inhibitor in particular with a content in the range from 0.05 to 6 wt. %, optionally at least one hardener with a content in the range from 0.05 to 8 wt. % for a chemical postcure, optionally at least one further organic or/and inorganic corrosion inhibitor in particular with a content in the range from 0.1 to 12 wt. %, optionally up to 35 wt % of additive(s) such as e.g. additives for substrate wetting such as in particular for bonding to electrodeposition coatings, wetting agents, defoaming agents, lubricants, bonding agents, pigments, flow control agents, agents to increase reactivity, surface additives to increase scratch resistance or/and thixotropic auxiliary agents, and optionally a total of 0.01 to 5 wt. % of water or/and at least one organic solvent, relative in each case to solids contents in wt. %.

Monomers and oligomers, oligomers and polymers, monomers and polymers or monomers, oligomers and polymers are included in the anticorrosive composition, wherein the content of such compounds, which are anionically, cationically or/and radically curable, is in particular at least 40 wt. %, particularly preferably at least 44 wt. %, most particularly preferably at least 48 wt. %, above all preferably at least 52 wt. %, in particular at least 56 wt. % and in particular up to a maximum of 92 wt. %, particularly preferably a maximum of 88 wt. %, most particularly preferably a maximum of 84 wt. %, above all preferably a maximum of 80 wt. %, in particular a maximum of 76 wt. %. The content of such compounds including photoinitiators, which are anionically, cationically or/and radically curable or curing, is in particular at least 45 wt. %, particularly preferably at least 50 wt. %, most particularly preferably at least 55 wt. %, above all preferably at least 60 wt. % and in particular up to a maximum of 99 wt. %, particularly preferably a maximum of 94 wt. %, most particularly preferably a maximum of 88 wt. %, above all preferably a maximum of 82 wt. %.

The process according to the invention or the anticorrosive composition according to the invention can also be characterised in that at least two components selected from the group of monomers, oligomers and polymers which are at least partially anionically, cationically or/and radically curable are added to the anticorrosive composition, wherein the content of monomers is in the range from 0 to 60 wt. %, the content of oligomers is in the range from 0 to 60 wt. % and a polymer content is optionally also necessary, wherein the content of polymers can be in the range from 10 to 70 wt. %, wherein on the one hand at least one monomer or/and at least one oligomer and in other embodiments also at least one polymer is present. The molecular weight of the added monomers is often in the range up to 500, advantageously in the range from 100 up to 350. The molecular weight of the oligomers is advantageously in the range from 300 up to 20000. The content of monomers is particularly preferably in the range from 1 to 58 wt. %, most particularly preferably over 16 and less than 52 wt. %, in particular over 22 and less than 44 wt. %; the content of oligomers is particularly preferably in the range from 1 to 58 wt. %, most particularly preferably over 16 and less than 52 wt. %, in particular over 22 and less than 44 wt. %; the content of polymers is particularly preferably in the range from 15 to 60 wt. %, most particularly preferably over 20 and less than 52 wt. %, in particular over 25 and less than 44 wt. %. At least some compounds from each of the three components monomers, oligomers and polymers—where present—are preferably anionically, cationically or/and radically polymerisable; all compounds from these components are particularly preferably radically polymerisable if no chemical postcure or/and no cationic polymerisation is to take place.

In the process according to the invention at least one base polymer based on acrylate, epoxide, methacrylate, polyester, polyurethane or/and copolymers thereof can preferably be added to the anticorrosive composition, in particular epoxy acrylate, polyester acrylate, urethane acrylate or/and mixtures thereof having a different basic chemistry or/and different molecular weights. In contrast to the optionally modified flexibilising resin and the coupling polymer, the base polymer serves to provide a good polymeric anticorrosive base. All polymers which within the context of this application are not classed as optionally modified flexibilising resins and not as coupling polymers are classed within the context of this application as base polymers. The base polymer can optionally be aliphatically modified and optionally made more flexible as a result. It is preferable that all oligomers and polymers used, optionally even including the added monomers, do not display a tendency to become brittle. In chemical crosslinking by anionic, cationic, radical or/and thermal means the base polymer can react inter alia with monomers, oligomers or/and polymers and with photoinitiators or/and hardeners. It can be dissolved in certain monomers, oligomers or/and polymers. It is advantageous to use a total content of base polymer(s) in the range from 5 to 50 wt. %, in particular at least 15 wt. % and at most 42 wt. %, above all at least 22 wt. % and at most 34 wt. %. In some circumstances at least a small proportion of the monomers, oligomers or/and polymers are advantageously copolymerisable or/and copolymerised.

The acid values of the added monomers, oligomers or/and polymers are in particular in the range from 1 to 5 mg/g KOH, measured in accordance with DIN 53402. The pH values of the added monomers, oligomers or/and polymers are in particular in the range from 4 to 9, particularly preferably in the range from 5 to 8.

The process according to the invention can also be characterised in that monomers or/and oligomers based on unsaturated, optionally aliphatic or/and aromatic compounds, such as those based on unsaturated aliphatic acrylates for example, are added to the anticorrosive composition. Particularly advantageous here are monofunctional, difunctional or/and trifunctional monomers or/and oligomers, but above all monofunctional compounds. In selecting particularly suitable monomers, oligomers or/and polymers, it can be ensured that a medium-sized crosslinking density and a narrow distribution of medium-sized chain lengths are achieved when these components are crosslinked. Surprisingly, in an optimisation by this means, it was possible to achieve firstly an exceptionally high flexibility and a very good adhesion to the metallic substrate and secondly also a very high chemical resistance. Normally it is possible to establish either a high flexibility and adhesion or a high chemical resistance. Monofunctional compounds crosslink more loosely, without forming potential break points in the network. Monofunctionality can increase flexibility many times due to the increased distance between crosslinking points and optionally reduce the crosslinking density. The total content of monofunctional monomers or/and monofunctional oligomers such as e.g. isobornyl acrylate or/and isobornyl methacrylate is preferably in a range from 3 to 58 wt. %, particularly preferably at least 12 and less than 43 wt. %, most particularly preferably at least 18 and less than 40 wt. %. The content of isobornyl acrylate or/and isobornyl methacrylate is in particular 16 to 45 wt. %, above all 28 to 42 wt. %. Monofunctional compounds are particularly preferred because they generally do not have a negative influence on elasticity. Difunctional compounds such as e.g. 2-ethylhexyl acrylate or/and dipropylene glycol diacrylate are conventionally good solvents for polymers and are therefore suitable for adjusting the viscosity of systems which are largely or entirely free from water or/and organic solvents. Trifunctional compounds such as e.g. hexanediol dicyl acrylate, tripropylene glycol diacrylate, trimethylol propane formal acrylate or/and trimethylol propane acrylate give rise to a particularly high reactivity, which can be important for high-speed coil coating processes in particular, and a particularly high hardness. The total content of difunctional monomers or/and difunctional oligomers, if used, is preferably in the range from 3 to 30 wt. %, particularly preferably at least 6 and less than 22 wt. %, most particularly preferably at least 12 and less than 16 wt. %.

The proportion of monofunctional or/and difunctional monomeric or/and oligomeric compounds in the anticorrosive composition, which are anionically, cationically or/and radically curable, is in particular at least 10 wt. %, particularly preferably at least 20 wt. %, most particularly preferably at least 30 wt. %, above all preferably at least 35 wt. %, in particular at least 40 wt. %, especially at least 42 wt. % and in particular up to 62 wt. %, particularly preferably up to 56 wt. %, most particularly preferably up to 50 wt. %.

The proportion of polymeric compounds in the anticorrosive composition, which are anionically, cationically or/and radically curable, is preferably at least 20 wt. %, particularly preferably at least 24 wt. %, most particularly preferably at least 28 wt. %, above all preferably at least 30 wt. %, in particular at least 32 wt. % and in particular up to 62 wt. %, particularly preferably up to 56 wt. %, most particularly preferably up to 50 wt. %.

The content of the at least one monofunctional monomer or/and at least one monofunctional oligomer is preferably 1 to 66 wt. %, particularly preferably 10 to 58 wt. %, most particularly preferably at least 20 wt. % and up to 52 wt. %, in particular at least 28 wt. % and up to 48 wt. %, above all at least 34 wt. % and up to 44 wt. %.

The process according to the invention can also be characterised in that at least one anionically, cationically or/and radically polymerisable monomer or/and oligomer is added to the anticorrosive composition, selected from the group of compounds based on acrylate or/and methacrylate, preferably those based on benzyl, butyl, diol, diacrylate, ethyl, formal acrylate, glycol, hexyl, isobornyl, methyl, propyl or/and styrene, in particular those selected from the group comprising butanediol diacrylate, diethylene glycol diacrylate DEGDA, dipropylene glycol diacrylate DPGDA, 2-ethylhexyl acrylate EHA, hexanediol dicyl acrylate HDDA, hydroxypropyl methacrylate HPMA, isobornyl acrylate IBOA, isobornyl methacrylate IBOMA, polyethylene diacrylate, triethylol propane formal acrylate, trimethyl propane triacrylate TMPTA, trimethyl propane formal acrylate TMPFA, triethylol propane acrylate, trimethylol propane acrylate TMPA and tripropylene glycol diacrylate TPGDA, most particularly preferably those selected from the group of compounds based on isobornyl. IBOA and IBOMA are preferred for particularly flexible coatings.

In the process according to the invention at least one flexibilising resin or/and at least one modified flexibilising resin can additionally be added to the anticorrosive composition as oligomers or/and polymers, in particular at least one based on unsaturated aliphatic polymers such as e.g. those based on acrylate, methacrylate, polyester or/and polyurethane, in particular based on acrylate, methacrylate or/and polyurethane. It can be dissolved in at least one monomer or/and oligomer. In this way they obtain a favourable viscosity for processing. An anionically, cationically or/and radically polymerisable, optionally modified flexibilising resin can substantially help to produce a particularly flexible dry film. The optionally modified flexibilising resin is preferably characterised in that when used without the addition of other substances apart from at least one photoinitiator and optionally at least one monomer to dissolve the flexibilising resin, it gives rise to a cured coating which displays a particularly high flexibility determined as elongation at break, in particular an elongation at break of at least 200, 250, 300, 350 or 400% of the initial length. The modification can be carried out with acrylic groups, for example. It is therefore advantageous to add a total content thereof in the range from 0.1 to 30 wt. %, in particular at least 0.8 wt. % and at most 22 wt. %, particularly preferably at least 1.5 wt. % and at most 15 wt. %, most particularly preferably at least 2 wt. % and at most 8 wt. %.

In the process according to the invention the anticorrosive composition can be selected in terms of double bonds of the oligomers or/and polymers and the content of monomers, oligomers or/and polymers and in terms of the duration, intensity and wavelength of the actinic radiation such that—in particular with monomers, oligomers or/and polymers displaying double bonds or/and unsaturated groups—a polymeric network having a medium-sized distance between crosslinking points is formed which at the same time has high flexibility and high chemical resistance, such that the crosslinked coating that is formed displays a T-bend flexibility of at least T≤2, in particular T≤1.

In the process according to the invention at least one photoinitiator for radical crosslinking can advantageously be added to the anticorrosive composition, based on compounds selected from the group comprising alkyl benzoyl formates, amino ketones, benzoin ethers, benzophenones, dimethyl ketals, glyoxylates, hydroxyketones, hydroxyphenones, isopropyl ethers, metallocenes, organic iodine compounds, phenyl ketones, phenyl propanes and phosphine oxides or/and at least one photoinitiator for anionic or/and cationic crosslinking based on compounds selected from the group comprising protonic acids, Lewis acids and Friedel-Crafts catalysts and carbonium ion salts—in particular at least one dispersion or/and solution—and optionally at least one crosslinking agent for a chemical postcure, in particular at least one capped hardener. The crosslinking agents are above all those based on isocyanate, isocyanurate, melamine resin or/and compounds which can release isocyanate or isocyanurate at elevated temperature, such as TDI, MDI, HDMI or/and HDI, for example. These can be based for example on 2,4- or 2,6-toluene diisocyanate (TDI), 4,4'-methylene di(phenyl)-isocyanate (MDI) or hexamethylene diisocyanate (HDI). Compounds forming free radicals under the influence of actinic radiation are suitable in principle as photoinitiators for the radical crosslinking. For an exceptionally high-quality anticorrosive coating, as is proposed within the context of this invention, the use of particularly reactive photoinitiators is recommended, particularly if coating is to be performed on a conveyor belt at a speed of over 40 m/min, in order to ensure an adequate anionic, cationic or/and radical polymerisation in a very short time. An anionic, cationic or/and radical polymerisation can be described as adequate in particular if over 60 MEK cycles are successfully withstood during solvent resistance testing.

If chemical postcuring is required, at least one postcuring compound, such as e.g. at least one ETL binder, particularly preferably at least one water-soluble or/and water-dispersible polymerisable postcuring compound, is also added to the anticorrosive composition in order to allow an anionic, cationic or/and radical cure and subsequently or/and later in conjunction with at least one hardener a chemical postcure, which is preferably initiated or/and intensified by heating. The total content of the at least one postcuring compound can in particular be 0.3 to 30 wt. %, relative to the dry matter. Its total content is preferably in the range from 1 to 25 wt. %, particularly preferably in the range from 1.5 to 20 wt. %, most particularly preferably in the range from 1.8 to 15 wt. %, above all at least 2 wt. % and up to 9 wt. %. It is thus possible to bring about only partial crosslinking, e.g. by UV curing, and then to trigger a gradual postcure, optionally extending over a period of around 12 days. At room temperature postcuring can extend over a number of days and can be accelerated by raised temperature or/and in the presence of a catalyst for the postcuring compound, such as e.g. dibutyl tin laurate (DBTL). Postcuring can take place slowly at room temperature in the presence of such binders and can contribute to additional polymerisation. More intensive and faster postcuring takes place at elevated temperature. If capped binders are used, however, capping must first be terminated chemically at around at least 80° C. before thermal crosslinking can take place. With capped postcuring compounds it is thus possible deliberately to start additional curing at a later time, provided that elevated temperature loads do not occur beforehand. Examples of preferred postcuring compounds include isocyanates and isocyanurates, which conventionally act as hardeners or crosslinking agents. These can be based for example on 2,4- or 2,6-toluene diisocyanate (TDI), 4,4'-methylene di(phenyl) isocyanate (MDI) or hexamethylene diisocyanate (HD). Isocyanates and isocyanurates based on HDI or/and TDI are preferably used. The postcuring compounds react with the free OH and polyol groups in the UV-curing resin to form polyureas, which are known to be highly resistant compounds, and related chemical compounds.

Suitable as crosslinking agents for a chemical postcure are in particular aliphatic or/and aromatic isocyanates and isocyanurates, in the case of capped hardeners in particular aliphatic or/and aromatic isocyanates and isocyanurates. The content of the at least one, optionally capped, hardener for chemical postcuring is preferably 0.8 to 9 wt. %, particularly preferably 1.2 to 6 wt. %, most particularly preferably at least 1.5 wt. % and up to 4 wt. %, in particular at least 1.8 wt. % and up to 3.6 wt. %.

The ratio of all binders without crosslinking agent to all crosslinking agents for chemical crosslinking and postcuring, including photoinitiators for anionic, cationic or/and radical crosslinking, is preferably 60:40 to 92:8, particularly preferably 65:35 to 88:12, particularly preferably at least 70:30 and up to 85:15.

The ratio of all binders without crosslinking agent to all crosslinking agents for chemical postcuring is preferably 80:20 to 95:5, particularly preferably 85:15 to 92:8, particularly preferably at least 88:12 and up to 90:10.

The ratio of all base polymers to all flexibilising resins including modified flexibilising resins is preferably 80:20 to 95:5, particularly, preferably 82:18 to 92:8, particularly preferably at least 6:1 and up to 8:1.

The ratio of all base polymers to all anionically, cationically or/and radically curable monomers and oligomers is preferably 90:10 to 35:65, particularly preferably 80:20 to 45:55, particularly preferably at least 45:55 and up to 60:40.

The ratio of all anionically, cationically or/and radically curable polymers without crosslinking agent to all anionically, cationically or/and radically curable monomers and oligomers without crosslinking agent is preferably 25:75 to 80:20, particularly preferably 32:68 to 65:35, particularly preferably at least 40:60 and up to 50:50.

In the process according to the invention at least one first organic corrosion inhibitor can preferably be added to the anticorrosive composition, selected from the group of compounds based on amines, derivatives of an organic acid such as e.g. dicarboxylic acid derivatives, thiols and conductive polymers, in particular based on succinic acid derivatives, ethyl morpholine derivatives, polyamine fatty acid derivatives or/and triazole derivatives. This inhibitor can be at least one alkanolamine, preferably a long-chain alkanolamine, at least one conductive polymer, e.g. based on polyaniline, or/and at least one thiol. It is preferably not highly volatile at room temperature. It can also be advantageous if it is readily soluble in water or/and readily dispersible in water, in particular with more than 0.5 WI. Particularly preferable inter alia are alkyl aminoethanols such as dimethyl aminoethanol and complexes based on a TPA amine such as N-ethyl morpholine complex with 4-methyl-γ-oxo-benzenebutanoic acid. The first organic corrosion inhibitor can be added in order to bring about a greater corrosion inhibition or further to intensify it. It is particularly advantageous if ungalvanised steel surfaces, in particular cold-rolled steel (CRS), are to be coated.

The content of the at least one first organic corrosion inhibitor is preferably 0.1 to 5.5 wt. %, particularly preferably 0.2 to 5 wt. %, most particularly preferably at least 0.3 wt. % and up to 4.5 wt. %, in particular at least 0.4 wt. % and up to 4 wt. %, above all at least 0.45 wt. % and up to 2.5 wt. %, above all less than 2 or less than 1.8 wt. %.

In the process according to the invention at least one further organic or/and inorganic corrosion inhibitor can advantageously be added to the anticorrosive composition, wherein the at least one inorganic corrosion inhibitor can be selected from the group based on anticorrosive pigments and compounds based on titanium, hafnium, zirconium, carbonate or/and ammonium carbonate, wherein the anticorrosive pigments are preferably those based on silica(s), oxide(s) or/and silicates, such as e.g. alkaline-earth-containing anticorrosive pigment(s), based in particular on calcium-modified silica or silicate pigment. The content of the at least one further organic or/and inorganic corrosion inhibitor is preferably 0.1 to 16 wt. %, particularly preferably 1 to 12 wt. %, most particularly preferably at least 3 wt. % and up to 7.5 wt. %, in particular at least 4.5 wt. % and up to 6.5 wt. %. Siliceous pigments are particularly preferred when they buffer the hydrogen ions in the coating mixture and thereby prevent the onset of corrosion.

The coating mixture according to the invention can preferably contain at least one anticorrosive pigment, wherein the total content of anticorrosive pigment in some embodiments can preferably be in the range from 0.1 to 15 wt. %, particularly preferably in the range from 0.5 to 10 wt. %, most particularly preferably in the range from 1.2 to 8 wt. %, relative to the solids content. In other embodiments the total content of anticorrosive pigment is preferably in the range from 0.1 to 8 wt. %, particularly preferably in the range from 0.5 to 6.5 wt. %, most particularly preferably in the range from 1 to 5 wt. %. As anticorrosive pigments, those based on at least one oxide, phosphate or/and silicate can be used in particular. Modified silica pigments and siliceous pigments, frequently as colloidal pigments, are often particularly preferred, because they can buffer the hydrogen ions in the coating mixture and therefore still further delay the onset of corrosion.

The anticorrosive composition according to the invention preferably contains at least one pigment such as e.g. at least one coloured pigment or/and at least one anticorrosive pigment, wherein within the context of this application the anticorrosive pigments are assigned to the corrosion inhibitors and the other pigments are classed as additives.

Furthermore, in a preferred embodiment the coating mixture according to the invention should include no content or the lowest possible content—in total preferably no more than 5 wt. %—of pigment having a moderately high or high absorption in the spectral range of the chosen actinic radiation or/and light type which is used for anionic, cationic or/and radical crosslinking, in particular UV radiation. In another embodiment the coating mixture according to the invention can preferably contain up to 20 wt. % of coloured or/and white pigments, wherein their absorption is in particular predominantly or largely outside the wavelength for irradiation in the case of anionic, cationic or/and radical curing; here it can be necessary to irradiate with a significantly higher energy, if the reflection of the radiation is to be significantly higher. The total content of pigments without anticorrosive pigments however is preferably in the range from 1 to 12 wt. %, particularly preferably in the range from 2 to 10 wt. %, most particularly preferably in the range from 3 to 8 wt. %. This is because often only the addition of a comparatively low content of anticorrosive pigment or other pigment is advantageous. In quite a few cases, moreover, the visible colour impression or absorption of many pigments is deleterious. On the other hand, the anticorrosive composition according to the invention is ideally suited for the addition of pigment types other than anticorrosive pigments, e.g. coloured pigments or hard materials such as e.g. isometric or more or less spherical pigments or hollow-particle powders.

The total content of the at least one additive is preferably 1.2 to 12.5 wt. %, particularly preferably 1.8 to 10 wt. %, most particularly preferably at least 2.5 wt. % and up to 9 wt. %, in particular at least 3.5 wt. % and up to 8 wt. %. A high content of coloured or/and white pigments can cause these ranges to be shifted by absolute values of 10 or even 15 or 20 wt. %, however. In such a case the content of the at least one additive can preferably be 10 to 32.5 wt. %, particularly preferably 13 to 30 wt. %, most particularly preferably at least 16 wt. % and up to 28 wt. %, in particular at least 18 wt. % and up to 26 wt. %.

The coating mixture according to the invention can contain at least one of the below-mentioned additives such as e.g. wetting agents such as those based on e.g. lecithin oil, silane(s), siloxane(s), other oil or/and defoaming agents such as e.g. those based on mineral oil(s), polysiloxane(s) or/and derivatives thereof such as e.g. copolymers, surface additives to increase scratch resistance, such as e.g. those based on silane(s), siloxane(s) or/and wax dispersion(s), additives for substrate wetting such as e.g. those based on lecithin oil, silane(s), siloxane(s), other oil or/and bonding agents such as e.g. for bonding to a metallic substrate, such as e.g. those based on organic phosphoric acid ester(s), complex fluoride(s) or/and epoxide(s), thixotropic auxiliary agents such as e.g. those based on fine-particle silicate or/and fine-particle $SiO_2$, additives for increasing reactivity (so-called co-initiators) such as e.g. those which can trap oxygen and at the same time form radicals, such as those based on tertiary amines for example. A wetting agent provides a homogeneous wetting for the substrate or to overcome the varying surface tension between different films. A defoaming agent ensures that as few air bubbles as possible are trapped in the applied coating so that no pores are formed in it. A flow control agent helps to form a homogeneous surface and in particular to prevent a rolling texture or/and orange-peel effect. If in particular at least four types or substances of additives are used or if several types of additives are used in elevated amounts, the total content of all additives can in particular be in the range from 0.05 to 22 wt. %, relative to the solids content. Their total content is preferably in the range from 0.3 to 20 wt. %, particularly preferably in the range from at least 1 and up to 17.5 wt. %, most particularly preferably in the range from at least 2 and up to 15 wt. %.

As additive(s) the coating mixture according to the invention can contain at least one lubricant, such as e.g. at least one based on graphite, polyethylene, polypropylene such as on the basis of polyethylene oxide or polypropylene oxide, polytetrafluoroethylene (PTFE), other types of waxes, silane, siloxane such as dimethyl siloxane or/and derivatives thereof, selected in particular from crystalline microwax(es), silane(s) or/and polysiloxane(s), wherein the total content of lubricant can in particular be in the range from 0.05 to 5 wt. %, relative to the solids content. Their total content is preferably in the range from 0.2 to 4 wt. %, particularly preferably in the range from 0.4 to 3 wt %, most particularly preferably in the range from 0.6 to 2.5 wt. %, in particular 2 wt. %. In terms of the type and quantity of lubricant, an addition of lubricant should be chosen so that the surfaces treated in this way can subsequently optionally also be printed, overpainted, glued or coated by other means.

In the process according to the invention at least one coupling polymer can preferably additionally be added to the anticorrosive composition, in particular at least one polymer based on amine such as tertiary amine, phosphoric acid monoesters, diesters, triesters and/or phosphor-containing acids such as phosphonic acids, and acrylate polymer, epoxide polymer, methacrylate polymer, polyester, polyurethane and/or copolymers of monomers corresponding to the above polymers. It is therefore advantageous to add a total content thereof in the range from 1 to 20 wt. %, in particular at least 7 wt. % and at most 14 wt. %.

In the process according to the invention the anticorrosive composition can contain as additive at least one pigment selected from the group of compounds based on coloured pigment, metal pigment, oxide, phosphate, phosphide, phosphosilicate, silicate, electrically conductive pigment and coated pigment or/and selected from the group comprising aluminium, aluminium alloys, iron alloys, iron hydroxide, iron oxide, iron phosphate, iron phosphide, graphite, silica, modified silica, optionally modified aluminium silicate, alkaline earth silicate or alumosilicate, hypostoichiometric electrically conductive oxide, carbon black, zinc and more highly corrosion-resistant aluminium- or/and zinc-containing alloy.

The coating mixture according to the invention and the coating produced from it are preferably free or largely free from environmentally damaging chromate. They are preferably free or largely free from heavy metals such as chromium, cobalt, copper or/and nickel, for example. They are frequently free from colouring components and will then display little or no colour—even as a cured polymeric coating. It is preferable to produce a polymeric coating which as far as possible is colourless, clear or at least transparent. For certain applications it can be desirable, however, to produce anticorrosive coatings coloured with dyes or/and pigments.

The anticorrosive composition preferably contains the following contents, wherein not all of the listed components or groups of compounds need to be added:

| | | |
|---|---|---|
| a) | Anionically, cationically or/and radically curing components: | 50-99 wt. % |
| | Base polymer(s) | 10-45 wt. % |
| | Flexibilising resin(s), optionally modified | 1-25 wt. % |
| | Monomer(s) and oligomer(s) | 5-65 wt. % |
| | of which monofunct. monomers + olig. | 5-55 wt. % |
| | of which difunct. monomers + oligomers | 1-55 wt. % |
| | of which trifunct. monomers + oligomers | 5-55 wt. % |
| | Photoinitiator(s) | 1-20 wt. % |
| | Photoinitiator(s) for anion./cation. crossl. | 1-20 wt. % |
| b) | Chemically postcuring components: | 1-24 wt. % |
| | Postcuring compound(s) | 0.5-12 wt. % |
| | Hardener | 0.5-12 wt. % |
| c) | Corrosion inhibitors: | 0.5-15 wt. % |
| | First organic | 0.1-5 wt. % |
| | Optional inorganic | 0.1-12 wt. % |
| | of which opt. anticorrosive pigments(s) | 1-12 wt. % |
| | Opt. further organic | 0.1-8 wt. % |

|   |   |   |
|---|---|---|
| d) | Additives: | 1-35 wt. % |
|   | Wetting agent | 0.1-2 wt. % |
|   | Defoaming agent | 0.1-2 wt. % |
|   | Lubricant | 0.1-5 wt. % |
|   | Coupling polymer | 1-18 wt. % |
|   | Bonding agent | 1-18 wt. % |
|   | Pigments, excl. anticorrosive pigm. | 0.1-18 wt. % |
|   | Thixotropic aux. agent | 0.1-5 wt. % |
|   | Flow control agent | 0.1-3 wt. % |
|   | Add. to increase scratch resistance | 0.1-2 wt. % |
|   | Add. to increase reactivity | 0.1-5 wt. % |
|   | Add. for substrate wetting | 0.1-2 wt. % |
| e) | Solvent: | 0.01-5 wt. % |
|   | Water | 0.01-5 wt. % |
|   | Organic solvent(s) | 0.01-5 wt. % |

The anticorrosive composition particularly preferably contains the following contents, wherein not all of the listed components or groups of compounds need to be added:

|   |   |   |
|---|---|---|
| a) | Anionically, cationically or/and radically curing components: | 60-98 wt. % |
|   | Base polymer(s) | 20-40 wt. % |
|   | Flexibilising resin(s), optionally mod. | 2-20 wt. % |
|   | Monomer(s) and oligomer(s) | 10-48 wt. % |
|   | of which monofunct. monomers + olig. | 10-50 wt. % |
|   | of which difunct. monomers + olig. | 10-50 wt. % |
|   | of which trifunct. monomers + olig. | 10-50 wt. % |
|   | Photoinitiator(s) | 2-18 wt. % |
|   | Photoinitiator(s) for anion./cation. crossl. | 2-18 wt. % |
| b) | Chemically postcuring components: | 1-16 wt. % |
|   | Postcuring compound(s) | 0.5-8 wt. % |
|   | Hardener | 0.5-8 wt. % |
| c) | Corrosion inhibitors: | 2-12 wt. % |
|   | First organic | 0.1-3 wt. % |
|   | Optional inorganic | 0.5-10 wt. % |
|   | of which opt. anticorrosive pigments(s) | 1-10 wt. % |
|   | Opt. further organic | 0.1-6 wt. % |
| d) | Additives: | 1.5-30 wt. % |
|   | Wetting agent | 0.1-1.5 wt. % |
|   | Defoaming agent | 0.1-1.5 wt. % |
|   | Lubricant | 0.1-1.5 wt. % |
|   | Coupling polymer | 3-14 wt. % |
|   | Bonding agent | 3-14 wt. % |
|   | Pigments, excl. anticorrosive pigm. | 0.1-14 wt. % |
|   | Thixotropic aux. agent | 0.1-4 wt. % |
|   | Flow control agent | 0.1-2 wt. % |
|   | Add. to increase scratch resistance | 0.1-1.5 wt. % |
|   | Add. to increase reactivity | 0.1-4 wt. % |
|   | Add. for substrate wetting | 0.1-1.5 wt. % |
| e) | Solvent, if added: | 0.01-4 wt. % |
|   | Water | 0.01-3 wt. % |
|   | Organic solvent(s) | 0.01-3 wt. % |

The anticorrosive composition most particularly preferably contains the following contents, wherein not all of the listed components or groups of compounds need to be added:

|   |   |   |
|---|---|---|
| a) | Anionically, cationically or/and radically curing components: | 70-97 wt. % |
|   | Base polymer(s) | 25-35 wt. % |
|   | Flexibilising resin(s), optionally mod. | 3-10 wt. % |
|   | Monomer(s) and oligomer(s) | 30-45 wt. % |
|   | of which monofunct. monomers + olig. | 20-45 wt. % |
|   | of which difunct. monomers + olig. | 10-45 wt. % |
|   | of which trtfunct. monomers + olig. | 10-45 wt. % |
|   | Photoinitiator(s) | 4-14 wt. % |
|   | Photoinitiator(s) for anson./cation. crossl. | 4-14 wt. % |
| b) | Chemically postcuring components: | 3-12 wt. % |
|   | Postcuring compound(s) | 1.5-6 wt. % |
|   | Hardener | 1.5-6 wt. % |
| c) | Corrosion inhibitors: | 5-8 wt. % |
|   | First organic | 0.1-1 wt. % |
|   | Optional inorganic | 1-7 wt. % |
|   | of which opt. anticorrosive pigments(s) | 1-7 wt. % |
|   | Opt. further organic | 0.1-4 wt. % |

The object is also achieved with an organic, anionically, cationically or/and radically cured anticorrosive coating on a metallic substrate which displays a dry film thickness in the range from 0.4 to 20 μm and which can also be characterised in that a) when applied directly to a metallic surface, without the interposition of a pretreatment coat, it displays a flexibility and bond strength of ≤T3, in particular of ≤T2 or even of ≤T1, determined by means of a T-bend test in accordance with ECCA standard T7 when bent by means of a compressed-air bending press on hot-galvanised (=HDG-precoated) steel sheets of 0.3 mm thickness organically coated to a film thickness of 8 μm, b) when applied directly to a metallic surface, without the interposition of a pretreatment coat, it displays a bond strength of ≤Gt 3, ≤Gt 2, ≤Gt 1 or Gt 0, determined by means of a cross-hatch adhesion test in accordance with DIN EN 2409 (with an Erichsen 430/II motorised cross-hatch cutter, brushing with a soft brush along the cuts) and by tearing off a firmly adhering strip of Tesa© 4651 adhesive tape from the cross-hatch area with visual assessment of the cross-hatch area and its flaking, c) when applied directly to a metallic surface, without the interposition of a pretreatment coat, it displays a corrosion resistance, tested as subsurface migration at a scratch, of ≤5 mm, ≤4 mm, ≤3 mm, ≤2 mm or ≤1 mm, determined in particular in a salt spray test SS to DIN 50021 at 35° C. for at least 150 h or for at least 200 h, preferably at least 200 h, at least 250 h, at least 300 h, at least 350 h, at least 400 h, at least 450 h or even at least 500 h, wherein the anticorrosive coating remains free from blisters, d) it displays perfect elasticity and bond strength in the indentation test in accordance with DIN EN ISO 1520 with an Erichsen 142-20 paints and coatings test machine tested with a 20 mm ball diameter at a drawing speed in the range from 0.1 to 0.3 mm/sec over a depth of more than 7 mm, until faults such as cracks, for example, occur;

e) when applied directly to a metallic surface, without the interposition of a pretreatment coat, it displays abrasion-free and fault-free cups in a determination of the cupping indentation (cup drawing) by the Erichsen test method using an Erichsen 142-20 universal sheet metal and strip testing machine with deep-drawing cup tool with a punch diameter of 33 mm and a pressing rate of 750 mm/min on blanks of 60 mm diameter made from metallic sheets coated according to the invention, f) when applied directly to a metallic surface, without the interposition of a pretreatment coat, it displays a chemical resistance of over 20 MEK cycles, of over 30 MEK cycles, of over 40 MEK cycles, of over 50 MEK cycles, of over 63 MEK cycles or of over 76 MEK cycles, determined in the MEK test with methyl ethyl ketone in accordance with ECCA standard T11, g) it displays a chemical resistance of over 50 MEK cycles, of over 60 MEK cycles, of over 63 MEK cycles, of over 70 MEK cycles, of over 76 MEK cycles, of over 80 MEK cycles, of over 86 MEK cycles, of over 90

MEK cycles or of over 96 MEK cycles, of over 100 MEK cycles, of over 110 MEK cycles, of over 120 MEK cycles or of over 130 MEK cycles, determined in the MEK test with methyl ethyl ketone in accordance with ECCA standard T11, h) an organic cured anticorrosive coating on a metallic substrate displays a dry film thickness in the range from 0.1 to 20 μm or from 0.4 to 20 μm and a chemical resistance of over 50 MEK cycles—the latter determined in the MEK test in accordance with ECCA standard T11 with methyl ethyl ketone—and it displays an elasticity and bond strength in the indentation test according to DIN EN ISO 1520 with a ball indentation of at least 6 mm, preferably at least 6.5 mm, particularly preferably at least 7, 7.5 or 8 mm, preferably tested with a sheet thickness of 0.75 mm relative to the perfect appearance, or/and i) it displays no embrittlement due to additional UV irradiation, determined by means of the T-bend test as a flexibility test in accordance with ECCA standard T7 before and after an additional ten UV irradiation cycles at a wavelength of around 340 nm and with a luminance of around 600 mJ/cm$^2$ in each case.

A chemical resistance of over 20 MEK cycles can already be regarded as very high. To the knowledge of the applicant, 20 MEK cycles are unknown for such chemical systems, which nevertheless contain significantly more than a total of 5 wt. % water or/and organic solvent. 20 to 100 MEK cycles can only be achieved with a very high reactivity of the chemical system. The crosslinkability and the MEK cycle count can be taken as indicators of this. The exceptionally high performance of the coatings according to the invention is also signalled by the fact that not only an unusually high chemical resistance but also in many cases a very high flexibility and bond strength is achieved at the same time. In addition, the coating according to the invention can be overpainted repeatedly with any thermally curing paint system. Coloured paints in particular are especially suitable. Due to the conventionally very long-lasting corrosion resistance, this coating is particularly suitable for the production of painted architectural applications as in structural steels, for example.

Due to the use of the anticorrosive composition according to the invention it is possible not only to dispense with the at least one pretreatment coat which nowadays is always applied below a first paint coat or paint-like coat but also to omit the at least one rinsing and the at least one re-rinsing solution or at least one drying which is commonly additionally used, without compromising on quality. The anticorrosive composition according to the invention is astonishingly inexpensive.

The substrates coated according to the invention can be used in particular in the steel industry, in automotive construction or/and in aircraft construction, in particular in standard car production, as wire, wire winding, wire mesh, sheet metal, cladding, screening, car body or car body part, part of a vehicle, trailer, caravan or flying body, covering, housing, lamp, light, traffic light element, item of furniture or furniture element, element of a domestic appliance, frame, profile, moulding with complex geometry, crash barrier element, radiator element or fencing element, bumper, part consisting of or having at least one pipe or/and one profile, window, door or bicycle frame or as a small component such as e.g. a screw, nut, flange, spring or spectacle frame.

The anticorrosive coating produced according to the invention can be used in particular as a protective coating in forming or/and joining, as corrosion protection for surfaces or in the vicinity of edges, seams or/and weld seams, as protection in place of cavity sealing or/and seam sealing, in particular for vehicle construction or aircraft construction.

It was also unexpectedly determined that with the combination of different binders both a high flexibility and at the same time a high chemical resistance can be achieved, which is unknown to the expert applicant either from practical experience or from the literature.

It was moreover surprising that it is possible for a very high reactivity for these organic coatings to be established via the choice of the photoinitiators for cationic or radical crosslinking and the monomers.

It was also surprisingly established that the ratio of organic to inorganic corrosion inhibitors in the anticorrosive composition which is favourable for extremely high corrosion resistance was not as expected in the range from around 1:1 to around 2.5:1 but in the range from 1:8 to 1:20.

The steel sheets coated according to the invention, in particular those produced on the conveyor belt, were outstandingly suitable for being formed together with the thin anticorrosive coating according to the invention to produce faultless corrugated sheet, for example, including the U-shaped profile at the edge of the corrugated sheet.

The present application also provides organic anticorrosive coatings in general on metallic substrates, wherein the coatings display a dry film thickness in the range from 0.4 to 20 μm and a chemical resistance of over 100 MEK cycles, determined in the MEK test in accordance with ECCA standard T11 with methyl ethyl ketone.

This chemical resistance is obtained in particular with an elasticity and bond strength determined in the indentation test to DIN EN ISO 1520 with a ball indentation of at least 6 mm.

EXAMPLES

Some selected embodiments are described below by way of example.

Binders in the form of mixtures were predominantly used. Binders, monomers, corrosion inhibitors, photoinitiators and additives were first mixed together according to the examples in Table 1. In the examples (see Table 1), 1.a, 1.b and 1.d are used as base polymers, 1.c as flexibilising resin, 1.e as hardener for chemical postcuring, 2.a and 2.b as monofunctional monomers, 2.c to 2.i as difunctional or multifunctional monomers and 3.a as bonding agent, 3.b and 3.c as lubricants, 3.d as wetting agent or/and 3.e as co-initiator to increase the reactivity. In each case the proportion of monomers added at the start was only 85 to 90 wt. % of the amounts given in Table 1. The mixtures were then ground in a bead mill. Here the solids, which were already in fine-particle form, were ground to a fineness of less than 10 μm. The remaining monomers (10 to 15 wt. % of the total monomer content) were then added. Finally the batch was stirred at high speed and then passed through a 40 μm screen to remove any dry areas and agglomerates that might have formed. The water content in each batch was around 0.1 wt. % and up to around 0.2 wt. %. The content of organic solvent was 0 or 0.05 wt. %. An optionally desired chemical postcure was initiated by heating to a temperature of 140° C. PMT.

For the examples in Table 1 hot-galvanised steel sheets of thickness 0.3 mm were used, which had not been provided with a pretreatment coat. The coating mixture according to the invention was applied by knife application and on a laboratory coater or by spraying in a wet film thickness of 7 to 9 μm. A maximum nozzle diameter of 1 mm was used for spraying. There was no need to dry the coated sheets since there was virtually no solvent content. The polymeric coating was cured twice in immediate succession at room temperature with an Hg-doped UV lamp in the wavelength range between 200 and 300 nm at a power of 120 W/cm at a belt speed of 5 m/min, producing an irradiation of approx. 15 cm in the direction of belt travel. The dry films produced in this way had a film thickness in the range from 7.6 to 8.4 μm.

The flexibilising resins were advantageously already pre-dissolved in IBOA or/and IBOMA, which allowed a very high elongation at break to be obtained. The elongation at break was measured in accordance with DIN 53504 on free organic cured films clamped in a tensile testing machine, extended and broken at room temperature, wherein the extension at the moment of break was measured as a % of the original length: this even produced values of at least 300% when only one photoinitiator was added to the pre-dissolved flexibilising resin and when this mixture was applied and cured.

The composition of the coating mixtures according to the invention is given in Table 1, the viscosities and properties of the coatings are set out in Table 2. In these tests both variants without and also one with an additional postcuring compound were tested. In parallel tests a standard industrial stoving enamel was applied to metal sheets produced in the same way and baked in order to test a two-coat structure; in comparison to the single coating composition the results were not significantly other than expected, however, for which reason the associated properties are not listed separately. As expected, however, the corrosion protection was improved by the thicker paint film structure and in some cases the flexibility or/and elasticity was slightly reduced.

In preliminary tests it was found that the coatings based on epoxy acrylate alone produced relatively poor results in one property because the coating had become partially detached and because the coating did not display adequate flexibility. Good results, even very good in terms of corrosion resistance, were obtained on the basis of mixtures with an epoxy acrylate content of well below 50 wt. %. Epoxy acrylate can make the polymeric coating very hard. Even the tests with a slightly higher content of organic solvent led to poorer results. Samples based on polyester urethane acrylate with aliphatic urethane acrylate or mixtures containing at least two modified polyester urethane acrylates proved themselves in particular. The content of binders based on at least one polyester urethane acrylate, at least one modified polyester urethane acrylate or/and at least one urethane acrylate is preferably 25 to 37 wt. %, particularly preferably 27 to 35 wt. %, in particular at least 28 wt. % and in particular up to 34 wt. %. The content of radical binders including chemical postcuring agents is preferably 25 to 41 wt. %, particularly preferably 27 to 39 wt. %, in particular at least 28 wt. % and in particular up to 37 wt. %.

The flexibility was determined firstly by means of a T-bend test e.g. of ≤T4 in accordance with ECCA standardT7 (European Coil Coating Association 1985): metal strips with a maximum width of 60 mm were bent using a compressed-air bending press from Wilhelm Jonescheit Maschinenfabrik. In this context T1 denotes the single thickness, T2 the double thickness etc. of the metal strip used as a measure for the diameter and the distance between the metal strips bent into a U shape with parallel faces, wherein a bending radius of e.g. T1 to T4 is set depending on the flexibility of the top coat in the case of topcoated sheets and of e.g. (T1)/2 for sheets without a topcoat and wherein T1 for example indicates the smallest bending dimension, wherein despite affixing strips of Tesafilm© 4104 in the area of the bend and subsequently tearing the Tesafilm away no damage visible to the naked eye occurs. In order to increase the contrast, a copper sulfate solution was applied beforehand. If no visible discoloration of the surface occurs, it can be assumed that the surface is undamaged.

Secondly the elasticity, flexibility and bond strength were tested by means of a ball drop test as an impact test in accordance with DIN EN ISO 6272 using an Erichsen 304 device with integral drop tube, using a 1 kg ball and an additional 1 kg supplementary weight from a drop height of 1 m. In the test the relevant sheets coated according to the invention remained mainly free from damage to the naked eye. The "direct impact test" as above was used with the primer-coated side, but without a cross-hatch adhesion grid.

An extremely high flexibility was achieved by choosing suitable reactive binders and monomers, such that with a dry film thickness of 8 μm T-bend test values of even ≤T1 and even T0 were achieved, whereas with similar anionically, cationically or/and radically curing binder systems, as in a UV edge protection coating, values of only T3 have previously been obtained.

The surface slip and forming properties were determined using the Erichsen cup indentation test. An Erichsen 142-20 cup drawing device with a 33 mm punch diameter and a pressing rate of 750 mm/min was used for testing on blanks of 60 mm diameter made from metal sheets coated according to the invention. This test was used to determine whether the formed sheets are free from abrasion and striation, wherein this is also used as a measure of the impact of rolling and forming processes.

In comparison to conventional primer coatings the surface slip and forming properties were found to be surprisingly good.

The elasticity and bond strength were also determined on metal sheets coated according to the invention by means of the Erichsen indentation test in accordance with DIN EN ISO 1520 with ball indentation from a ball of 20 mm diameter and using an Erichsen 202-C device, wherein the ball was pushed into the uncoated back of the metal sheet coated on one side according to the invention at a speed of 0.1 to 0.3 mm/sec. A cross-hatch adhesion grid was not used in this case. The formed sheets should display no cracks or peeling of the coating; the indentation depth in mm is measured before the first faults start to develop, such as peeling or cracks which are visible to the naked eye. Sheet thicknesses of 0.75 mm were used for testing. In addition, the bond strength and freedom from peeling and cracks can be tested again if required on the formed parts by affixing and then tearing off strips of Tesafilm. The greater the indentation values, the better the elasticity and bond strength.

The elasticity that was measured is in some cases markedly better than in conventional primer coatings.

The corrosion resistance was measured on metal sheets coated according to the invention in a salt spray test according to DIN 50021, firstly over the area of the metal sheets coated according to the invention and secondly on scratched sheets coated according to the invention, by means of subsurface migration at the scratch after test times of varying lengths.

An exceptionally high corrosion protection was provided for paint-like coatings with a dry film thickness of 8 μm. To the knowledge of the applicant such values have never before been achieved with a paint or paint-like coating: after over 200 hours of salt spray test there were still no significant signs of corrosion in examples B1 to B10 according to the invention, with no traces at all after 150 h and 300 h, however. Some samples complied with the standard even after over 400 h, since even after this time there was still no blistering. After 150 h and 350 h subsurface migration at the scratch on metal sheets coated according to the invention was only 1 to 2 mm, whereas conventionally subsurface migration of 4 to 10 mm is measured. Some samples successfully survived even 400 h at the scratch.

The adhesion was tested in the cross-hatch adhesion test to DIN EN 2409. With the exception of examples B14 and B15, values of below Gt 2, often even below Gt 0, were determined in the examples according to the invention. Conventional primer coatings which are applied directly to a metallic surface without a pretreatment coat virtually always display values of Gt 4 or Gt 5, where values range from Gt 0 to Gt 5 and Gt 5 is the poorest.

Regarding adhesion to the metallic substrate, to the knowledge of the applicant, values of T0 even without the presence of a pretreatment coat were obtained for the first time with an anionically, cationically or/and radically curing binder system in the T-bend test. Such a high adhesion, obtained by means of the binding properties of the polymers and the coupling additives, appears to be useful and in some cases even necessary, however, if the anticorrosive composition according to the invention is applied directly to the metallic substrate as a pretreatment primer.

The anticorrosive coating according to the invention could be overpainted very effectively, which is by no means self-evident, and displayed a very high chemical resistance, wherein the high quality was also achieved through the choice of resins and their crosslinking. The overpainting ability could be improved with the same measures that were used to improve the adhesion.

Even after ageing of the binder system, the anticorrosive coating according to the invention displayed practically no embrittlement, unlike aqueous UV systems, in which embrittlement can be clearly observed firstly after a period of 2 to 3 days of curing after UV irradiation and secondly over the years thereafter in long-term ageing. To the knowledge of the applicant, anionically, cationically or/and radically curing binder systems displaying so little embrittlement have not previously been known in a 100% system (paint-like system with little or no content of water or/and solvent(s)). The embrittlement tendency was determined on metal sheets coated according to the invention and cured, by means of the T-bend test as a flexibility test in accordance with ECCA standard T7, before and after an additional ten UV irradiation cycles at a wavelength of around 340 nm and with a luminance of around 600 mJ/cm$^2$, 2 days after application. The embrittlement tendency is low or undetectable if the T-bend test values are unchanged in comparison to the T-bend test values prior to these additional irradiation cycles after an additional five UV irradiation cycles and exceptionally low or undetectable after the use of an additional eight irradiation cycles. It is assumed here that the film had already been adequately cured in advance so that an embrittlement or overcuring can be simulated. An adequate crosslinking could be ensured by a suitable choice of monomers, oligomers or/and polymers and of suitable initiators and by the amounts used. There is therefore no measurable postcuring and no measurable embrittlement. Tables 2 and 3 show the properties after an additional 10 irradiation cycles. Cracks are an indication here that even without additional irradiation a comparatively very high crosslinking was achieved.

Even immediately after application and adequate crosslinking of the anticorrosive composition on a strip, the anticorrosive coating according to the invention proved to be tack-free.

The chemical resistance was determined in the MEK test with methyl ethyl ketone solvent in accordance with ECCA standard T11. Constant regular wiping of a 25-cm length of the surface of the anticorrosive coating with cotton wool with an application weight of around 40 g in accordance with standard ECCA T11 for more than 30 cycles (=double strokes) was used to determine how many cycles are withstood by the anticorrosive coating according to the invention without damage to its surface that is visible to the naked eye.

The reactivity of the binder system according to the invention could be dramatically improved, in particular through the choice of photoinitiators—in particular according to their reactivity, more reactive binders and the addition of tertiary amine, wherein binders were preferably chosen which with adequate curing display an MEK resistance of over 40 cycles with a dry film thickness of just 8 µm; in the tests, however, an MEK resistance of up to 132 cycles was even achieved. Furthermore, with a slower belt speed and alternatively with a higher number of UV lamps, which with the same film thickness also led to slower UV curing, MEK cycle counts of 106, 110, 119, 123 and 132 were achieved. In the MEK test it is important to keep all test conditions constant, especially the wiping conditions.

The water resistance was tested in the condensation water alternating climate test in accordance with DIN 50017 for 400 h. Here the metal sheets coated according to the invention were stored in deionised water without being moved. With adequate adjustment of the anticorrosive composition and processing conditions, blister-free anticorrosive coatings showing no signs of damage to the naked eye could be obtained in many cases after 400 h of testing. Some samples could successfully withstand this test for 500 h or even for 600 h.

In a further series of tests additional changes were made to the composition according to the invention, starting from the composition of example B 14 in Table 1 (see Table 4 in this regard):

In examples B 25 to B 29, a different modified polyurethane acrylate with improved reactivity was used in place of the unmodified polyurethane acrylate previously used. In examples B 26 to B 29 this content was also slightly increased and the proportion of isobornyl methacrylate reduced accordingly. In examples B 27 to B 29 benzophenone was also replaced by a more reactive mixture based on alkyl benzoyl formate. In examples B 28 and B 29 this content was also increased slightly. In example B 29 polypropylene wax was also added in addition. Otherwise the manufacturing conditions for the coated substrates were very largely identical to those for the previously described examples. It is expected that similar process changes to those described here, building on the other comparative examples, will in at least some cases lead to the coatings according to the invention and produce MEK values of up to around 150 cycles.

TABLE 1

Composition of the examples according to the invention, calculated on solids contents in wt. %

| Examples | B 1 | B 2 | B 3 | B 4 | B 5 | B 6 | B 7 | B 8 | B 9 | B 10 | B 11 | B 12 |
|---|---|---|---|---|---|---|---|---|---|---|---|---|
| *Radical binders and chemical postcuring agents* | | | | | | | | | | | | |
| 1.a. Polyester urethane acrylate | 12 | 20 | 15.5 | 16 | 16 | 16 | 16 | 16 | 16 | 16 | 16 | 16 |
| 1.b. Mod. polyester urethane acrylate | 12 | 12 | 11 | 9 | 15 | 11 | 12 | 12 | 12 | 12 | 12 | 12 |
| 1.c. Unsat. aliph. urethane acrylate | 4 | 4 | 4 | 4 | 4 | 4 | — | 1 | 7 | — | 4 | 4 |
| 1.d. Aromatic epoxide acrylate | — | — | — | — | — | — | — | — | — | 5 | — | — |
| 1.e. HDI isocyanurate, capped | — | — | — | — | — | — | — | — | — | — | — | — |
| *Reactive thinners* | | | | | | | | | | | | |
| 2.a. Isobornyl acrylate | 20.6 | 13 | 21.6 | 20 | 14 | 18.3 | 27 | 21 | 18 | 20 | 18.5 | 25 |
| 2.b. Isobornyl methacrylate | 22.5 | 19 | 18 | 19 | 19 | 19 | 15 | 18 | 15 | 10 | 19 | 19 |
| 2.c. 2-Ethylhexyl acrylate | — | — | — | — | — | — | — | — | — | — | — | — |
| 2.d. Dipropylene glycol diacrylate | — | — | — | — | — | — | — | — | — | 5 | — | — |
| 2.e. Tripropylene glycol diacrylate | — | — | — | — | — | — | — | — | — | — | — | — |
| 2.f. Hexanediol diacrylate | — | — | — | — | — | — | — | — | — | — | — | — |
| 2.g. Trimethylol propane formal acrylate | — | — | — | — | — | — | — | — | — | — | — | — |
| 2.h. Trimethylol propane triacrylate | — | — | — | — | — | — | — | — | — | — | — | — |
| 2.i. Butanediol acrylate | — | — | — | — | — | — | — | — | — | — | — | — |
| *Additives* | | | | | | | | | | | | |
| 3.a. Acrylic-modif. phosphoric acid partial ester | 12 | 12.5 | 12.5 | 12.5 | 12.5 | 12.5 | 12.5 | 12.5 | 12.5 | 12.5 | 12.5 | 12.5 |
| 3.b. Acrylate-functional polydimethyl siloxane | 0.9 | 1 | 0.9 | 1 | 1 | 0.7 | 1 | 1 | 1 | 1 | 1 | 1 |
| 3.c. PTFE wax | — | — | — | — | — | — | — | — | — | — | — | — |
| 3.d. Soya lecithin oil | — | — | — | — | — | — | — | — | — | — | — | — |
| 3.e. Tertiary amine | — | — | — | — | — | — | — | — | — | — | — | — |
| *Corrosion inhibitors* | | | | | | | | | | | | |
| 4.a. (Benzothiazol-2-ylthio)succinic acid derivative | 0.5 | 0.5 | 0.5 | 0.5 | 0.5 | 0.5 | 0.5 | 0.5 | 0.5 | 0.5 | — | 0.5 |
| 4.b. 4-Oxo-4-tolyl butanoic acid | — | — | — | — | — | — | — | — | — | — | 1 | — |
| 4.c. Ca-modified silicate pigment | 6 | 6 | 6 | 6 | 6 | 6 | 6 | 6 | 6 | 6 | 6 | — |
| *Photoinitiators* | | | | | | | | | | | | |
| 5.a. 1-Hydroxycyclohexyl phenyl ketone | 8 | 8 | 8 | 8 | 8 | 8 | 8 | 8 | 8 | 8 | 8 | 8 |
| 5.b. 1-Hydroxycyclohexyl phenyl ketone and benzophenone | — | — | — | — | — | — | — | — | — | — | — | — |
| 5.c. Benzophenone | — | 4 | — | 4 | 4 | 4 | — | 4 | 4 | 4 | — | — |
| 5.d. Hydroxyphenone derivative | 2 | — | 2 | — | — | — | 2 | — | — | — | 2 | 2 |

| Examples | B 13 | B 14 | B 15 | B 16 | B 17 | B 18 | B 19 | B 20 | B 21 | B 22 | B 23 | B 24 |
|---|---|---|---|---|---|---|---|---|---|---|---|---|
| *Radical binders and chemical postcuring agents* | | | | | | | | | | | | |
| 1.a. Polyester urethane acrylate | 16.5 | 16 | 18 | 16 | 16 | 16 | 17 | 17 | 17 | 17 | 17 | 17 |
| 1.b. Mod. polyester urethane acrylate | 12 | 12 | 15 | 12 | 12 | 12 | 12 | 12 | 11 | 11 | 11 | 11 |
| 1.c. Unsat. aliph. urethane acrylate | 4 | 4 | 5 | 6 | 4 | 4 | 4 | 5 | 4 | 4 | 4 | 4 |
| 1.d. Aromatic epoxide acrylate | — | — | — | — | — | — | — | — | — | — | — | — |
| 1.e. HDI isocyanate, capped | 3 | — | — | — | — | — | — | — | — | — | — | — |
| *Reactive thinners* | | | | | | | | | | | | |
| 2.a. Isobornyl acrylate | 16.1 | 23.5 | 22.5 | 17.5 | 16 | 16 | 19.5 | 34.5 | 18 | 18 | 18 | 18 |
| 2.b. Isobornyl methacrylate | 18 | 18 | 15 | 18 | 2 | 2 | 16 | — | 2 | 2 | 2 | 2 |
| 2.c. 2-Ethylhexyl acrylate | — | — | 5 | — | — | — | — | — | 18 | — | — | — |
| 2.d. Dipropylene glycol diacrylate | — | — | — | — | — | — | — | — | — | 18 | — | — |
| 2.e. Tripropylene glycol diacrylate | — | — | — | — | — | — | — | — | — | — | 18 | — |
| 2.f. Hexanediol dicyl acrylate | — | — | — | — | — | — | — | — | — | — | — | 18 |
| 2.g. Trimethylol propane formal acrylate | — | — | — | — | 19.5 | — | — | — | — | — | — | — |
| 2.h. Trimethylol propane triacrylate | — | — | — | — | — | 19.5 | — | — | — | — | — | — |
| *Additives* | | | | | | | | | | | | |
| 3.a. Acrylic-modif. phosphoric acid partial ester | 12.5 | 8 | — | 13 | 13 | 13 | 12 | 12 | 12 | 12 | 12 | 12 |
| 3.b. Acrylate-functional polydimethyl siloxane | 0.9 | — | 1 | 1 | 1 | 1 | — | 1 | 1 | 1 | 1 | 1 |
| 3.c. PTFE wax | — | — | — | — | — | 1 | — | — | — | — | — | — |
| 3.d. Soya lecithin oil | 0.5 | — | — | — | — | — | — | — | — | — | — | — |
| 3.e. Tertiary amine | — | — | — | — | — | — | — | — | — | — | — | — |

TABLE 1-continued

Composition of the examples according to the invention, calculated on solids contents in wt. %

Corrosion inhibtion

| | | | | | | | | | | | | |
|---|---|---|---|---|---|---|---|---|---|---|---|---|
| 4.a. (Benzothiazol-2-ylthio)succinic acid derivative | 0.5 | 0.5 | 0.5 | 0.5 | 0.5 | 0.5 | 0.5 | 0.5 | 1 | 1 | 1 | 1 |
| 4.b. 4-Oxo-4-tolyl butanoic acid | — | — | — | — | — | — | — | — | — | — | — | — |
| 4.c. Ca-modified silicate pigment | 6 | 6 | 6 | 6 | 6 | 6 | 6 | 6 | 6 | 6 | 6 | 6 |

Photoinitiators

| | | | | | | | | | | | | |
|---|---|---|---|---|---|---|---|---|---|---|---|---|
| 5.a. 1-Hydroxycyclohexyl phenyl ketone | — | 8 | 8 | 8 | 8 | 8 | 8 | 8 | 8 | 8 | 8 | 8 |
| 5.b. 1-Hydroxycyclohexyl phenyl ketone and benzophenone | 10 | — | — | — | — | — | — | — | — | — | — | — |
| 5.c. Benzophenone | — | 4 | 2 | — | — | — | 4 | 2 | — | — | — | 4 |
| 5.d. Hydroxyphenone derivative | — | — | 2 | 2 | 2 | 2 | — | 2 | 2 | 2 | 2 | — |

TABLE 2

Properties of the coatings according to the invention with a dry film thickness of 8 μm - with no pretreatment coat

| Properties | B 1 | B 2 | B 3 | B 4 | B 5 | B 6 | B 7 | B 8 |
|---|---|---|---|---|---|---|---|---|
| Viscosity range at room temperature in mPa · s | 850 | 850 | 850 | 850 | 850 | 850 | 850 | 850 |
| Flexibility by T-bend test to ECCA T7 | T0 | T0 | T0 | T0 | T0 | T0 | T3 | T3 |
| Bond strength of coating to substrate to DIN EN ISO 2409 | Gt 0 | Gt 0 | Gt 0 | Gt 0 | Gt 0 | Gt 0 | Gt 0 | Gt 0 |
| Thermoformability by cup drawing | OK | OK | OK | OK | OK | OK | Abrasion | Abrasion |
| Elasticity of coating in mm: indentation test to DIN EN ISO 1520 with ball indentation | 9 | 9 | 9 | 8.5 | 8.5 | 8.5 | 6 | 6.5 |
| Ball drop test with 2 kg ball from 1 m drop height to DIN EN ISO 6272 | OK | OK | OK | OK | OK | OK | Cracks | Cracks |
| Salt spray test to DIN 50021 SS, flat specimen after 150 h and in same way after 350 h | OK Blisters | OK OK | OK Blisters | OK OK | OK OK | OK OK | OK OK | OK OK |
| Salt spray test to DIN 50021 SS, subsurface migration at scratch after 150 h ≤ 2 mm and in same way after 350 h | OK >3 mm | OK OK | OK >3 mm | OK OK | OK OK | OK OK | OK >2 mm | OK OK |
| Chemical resistance MEK test to ECCA T11 in cycles | 70 | 100 | 80 | 80 | 90 | 90 | 75 | 70 |
| Water resistance after 400 h to ISO 6270 | OK | OK | OK | OK | OK | OK | OK | OK |
| Ageing after 2 days in T-bend test with 10 additional irradiation cycles | OK | OK | OK | OK | OK | OK | Clear cracks | Clear cracks |
| Overpaintability, visual assessment | OK | OK | OK | OK | OK | OK | OK | OK |

| Properties | B 9 | B 10 | B 11 | B 12 | B 13 | B 14 | B 15 | B 16 |
|---|---|---|---|---|---|---|---|---|
| Viscosity range at room temperature in mPa · s | 850 | 1050 | 850 | 850 | 850 | 850 | 1100 | 900 |
| Flexibility by T-bend test to ECCA T7 | T0 | T2 | T0-1 | T0-1 | T0-1 | T2-3 | T5 | T0 |
| Bond strength of coating to substrate to DIN EN ISO 2409 | Gt 0 | Gt 0 | Gt 0 | Gt 0 | Gt 0 | Gt 3 | Gt 5 | Gt 0 |
| Thermoformability by cup drawing | OK | Abrasion | OK | OK | OK | Abrasion | Much abrasion | OK |
| Elasticity of coating in mm: indentation test to DIN EN ISO 1520 with ball indentation | 9 | 7 | 8 | 8.5 | 9 | 7 | 5 | 7.5 |
| Ball drop test with 2 kg ball from 1 m drop height to DIN EN ISO 6272 | OK | Cracks | OK | OK | OK | Extensive cracks | Many cracks, flaking | OK |
| Salt spray test to DIN 50021 SS, flat specimen after 150 h and in same way after 350 h | OK OK | OK OK | OK Blisters | Blisters Corrosion | OK Blisters | OK Blisters | Blisters Corrosion | OK OK |
| Salt spray test to DIN 50021 SS, subsurface migration at scratch after 150 h ≤ 2 mm and in same way after 350 h | OK OK | OK OK | OK >2 mm | Corrosion Corrosion | OK >3 mm | >2 mm >3 mm | Corrosion Corrosion | OK OK |

TABLE 2-continued

Properties of the coatings according to the invention with a dry film thickness of 8 μm - with no pretreatment coat

| | | | | | | | | |
|---|---|---|---|---|---|---|---|---|
| Chemical resistance MEK test to ECCA T11 in cycles | 70 | 75 | 70 | 70 | 80 | 60 | 40 | 80 |
| Water resistance after 400 h to ISO 6270 | OK | OK | OK | Blisters | OK | Blisters | Blisters | OK |
| Ageing after 2 days in T-bend test with 10 additional irradiation cycles | OK | Slight cracks | OK | OK | OK | Clear cracks | Clear cracks | OK |
| Overpaintability, visual assessment | OK | OK | OK | OK | OK | OK | OK | OK |

| Properties | B 17 | B 18 | B 19 | B 20 | B 21 | B 22 | B 23 | B 24 |
|---|---|---|---|---|---|---|---|---|
| Viscosity range at room temperature in mPa · s | 1100 | 1100 | 850 | 850 | 850 | 950 | 1000 | 1000 |
| Flexibility by T-bend test to ECCA T7 | T2 | T3 | T0 | T1-2 | T2-3 | T2-3 | T3-4 | T3-4 |
| Bond strength of coating to substrate to DIN EN ISO 2409 | Gt 1 | Gt 1 | Gt 0 | Gt 0 | Gt 1-2 | Gt 1-2 | Gt 1-2 | Gt 1-2 |
| Thermoformability by cup drawing | Abrasion | Abrasion | OK | OK | Abrasion | Abrasion | Abrasion | Abrasion |
| Elasticity of coating in mm: indentation test to DIN EN ISO 1520 with ball indentation | 5-6 | 5-6 | 8 | 6-7 | 5-6 | 5-6 | 5-6 | 5-6 |
| Ball drop test with 2 kg ball from 1 m drop height to DIN EN ISO 6272 | Extensive cracks | Extensive cracks | OK | OK | Extensive cracks | Extensive cracks | Extensive cracks | Extensive cracks |
| Salt spray test to DIN 50021 SS, flat specimen after 150 h and in same way after 350 h | OK OK | OK OK | OK OK | OK OK | OK OK | OK OK | OK OK | OK OK |
| Salt spray test to DIN 50021 SS, subsurface migration at scratch after 150 h ≤ 2 mm and in same way after 350 h | OK >2 mm | OK >2 mm | OK OK | OK >2 mm | OK >2 mm | OK >2 mm | OK >2 mm | OK >2 mm |
| Chemical resistance MEK test to ECCA T11 in cycles | 75 | 75 | 60 | 60 | 60 | 60 | 60 | 60 |
| Water resistance after 400 h to ISO 6270 | OK | OK | OK | OK | OK | OK | OK | OK |
| Ageing after 2 days in T-bend test with 10 additional irradiation cycles | Slight cracks | Clear cracks | OK | OK | Slight cracks | Slight cracks | Clear cracks | Clear cracks |
| Overpaintability, visual assessment | OK | OK | OK | OK | OK | OK | OK | OK |

TABLE 3

Properties of the coatings according to the invention with a dry film thickness of 8 μm, for four examples on the left on top of an additional pretreatment coat and on the right with a topcoat instead, with otherwise the same conditions as in the previous tables

| Properties | B 1 | B 2 | B 3 | B 4 | B 1 | B 2 | B 3 | B 4 |
|---|---|---|---|---|---|---|---|---|
| Differences from the previous examples | On top of an additional chromium-free pretreatment coat based on a composition with fluoride and phosphate, no topcoat | | | | No pretreatment coat, with an additional topcoat in a dry film thickness of 30 μm of a thermally curing staving enamel, 20 min 160° C. | | | |
| Flexibility by T-bend test to ECCA T7 | ≤T1 | ≤T1 | ≤T1 | ≤T1 | T2 | ≤T2 | ≤T3 | ≤T3 |
| Bond strength of coating to substrate to DIN EN ISO 2409 | Gt 0 | Gt 0 | Gt 0 | Gt 0 | Gt 0 | Gt 0 | Gt 0 | Gt 0 |
| Thermoformability by cup drawing | OK | OK | OK | OK | — | — | — | — |
| Elasticity of coating in mm: indentation test to DIN EN ISO 1520 with ball indentation | 8.5 | 8.5 | 8.5 | 8 | 7.5 | 8 | 7 | 7 |
| Ball drop test with 2 kg ball from 1 m drop height to DIN EN ISO 6272 | OK | OK | OK | OK | OK | OK | OK | OK |
| Salt spray test to DIN 50021 SS, flat specimen after 200 h and in same way after 500 h | OK Blisters | OK OK | OK Blisters | OK OK | — — | — — | — — | — — |
| Salt spray test to DIN 50021 SS, flat specimen after 500 h and in same way after 1000 h | — — | — — | — — | — — | OK OK | OK OK | OK OK | OK OK |
| Salt spray test to DIN 50021 SS, subsurface migration at scratch after 200 h ≤ 2 mm and in same way after 400 h | OK >2 mm | OK OK | OK >2 mm | OK OK | — — | — — | — — | — — |

TABLE 3-continued

Properties of the coatings according to the invention with a dry film thickness of 8 μm, for four examples on the left on top of an additional pretreatment coat and on the right with a topcoat instead, with otherwise the same conditions as in the previous tables

| Properties | B 1 | B 2 | B 3 | B 4 | B 1 | B 2 | B 3 | B 4 |
|---|---|---|---|---|---|---|---|---|
| Salt spray test to DIN 50021 SS, subsurface migration at scratch after 400 h ≤ 2 mm and in same way after 800 h | — | — | — | — | OK | OK | OK | OK |
| | — | — | — | — | OK | OK | OK | OK |
| Chemical resistance MEK test to ECCA T11 in cycles | 70 | 100 | 80 | 60 | 100 | 100 | 100 | 100 |
| Water resistance after 400 h to ISO 6270 | OK | OK | OK | OK | OK | OK | OK | OK |
| Ageing after 2 days in T-bend test with 10 additional irradiation cycles | OK | OK | OK | OK | Cracks | Cracks | Cracks | Cracks |
| Overpaintability, visual assessment | OK | OK | OK | OK | OK | OK | OK | OK |

TABLE 4

Properties of the coatings produced in the further series of tests

| Example | B 25 | B 26 | B 27 | B 28 | B 29 |
|---|---|---|---|---|---|
| Chemical resistance MEK test to ECCA T11 in cycles | 106 | 110 | 119 | 123 | 132 |
| Elasticity of coating in mm: indentation test to DIN EN ISO 1520 with ball indentation, sheet thickness 0.75 mm | 8 | 8 | 7 | 8 | 9 |
| Thermoformability by cup drawing | OK, no abrasion | Little abrasion | Abrasion | Little abrasion | OK, no abrasion |
| Overpaintability, visual check | OK | OK | OK | OK | OK |

The invention claimed is:

1. A process for coating a metallic surface of a metallic substrate comprising
applying, an organic, cationically or radically curable anticorrosive composition to the metallic surface, wherein the anticorrosive composition comprises a dispersion or solution containing at least two components that are at least partially cationically or radically curable, wherein the at least two components are selected from the group consisting of a monomer, an oligomer and a polymer with a total content in the range from 60 to 92 wt. %, wherein the polymer is based on at least one member selected from the group consisting of a polyester urethane acrylate, a modified polyester urethane acrylate, an aliphatic urethane acrylate and an aromatic epoxide acrylate, wherein at least one monomer or oligomer is present in an amount of from 10 to 50 wt. %, of which at least 12 wt. % are isobornyl acrylates, isobornyl methacrylate or a mixture thereof;
from 2 to 18 wt. % of at least one photoinitiator for at least one of cationic or radical crosslinking if electron beam radiation is not used,
from 0.1 to 3 wt. % of a first organic corrosion inhibitor,
from 1.5 to 30 wt. % of an additive,
from 7 to 18 wt. % of at least one coupling polymer based on a phosphoric acid partial ester; and
at least one of water or an organic solvent in a total content of 0.01 to 5 wt.%, relative in each case to the solids contents in wt. %,
wherein the anticorrosive composition is applied to the metallic surfaces in a wet film thickness in the range from 0.4 to 25 μm; and at least one of cationically, or radically curing the composition to form an anticorrosive coating on the metal surface, wherein the anticorrosive coating has a dry film thickness in the range from 0.4 to 20 μm and a chemical resistance of over 50 MEK cycles, determined in the MEK test in accordance with ECCA standard T11 with methyl ethyl ketone wherein the coating has a chemical resistance of at least 40 MEK cycles,
wherein the metallic substrate is coated at a belt speed of from 80 to 220 m per minute;
wherein if the corrosion inhibitor is an anticorrosive pigment, the amount of the anticorrosive pigment ranges from 0.1 to 8 wt. %; and
wherein the metallic surface is cleaned or pickled before application of the composition.

2. A process for coating a metallic surface of a metallic substrate comprising applying an organic, cationically or radically curable anticorrosive composition, without applying a pretreatment coat prior to applying the anticorrosive composition, wherein the anticorrosive composition consists of a dispersion or solution which is applied directly to the metallic surface in a wet film thickness in the range from 0.4 to 25 μm, is optionally dried and is then at least one of cationically or radically cured to form an anticorrosive coating on said metallic surface which displays a dry film thickness in the range from 0.4 to 20 μm, wherein the anticorrosive coating achieves a flexibility and bond strength of less than or equal to T3, determined by means of a T-bend test in accordance with ECCA standard T7 on hot-galvanised precoated steel sheets of 0.3 mm thickness organically coated in a film thickness of 8 μm, wherein the coating has a chemical resistance of at least 40 MEK cycles,
wherein the metallic substrate is coated at a belt speed of from 80 to 220 m per minute;
wherein if the corrosion inhibitor is an anticorrosive pigment, the amount of the anticorrosive pigment ranges from 0.1 to 8 wt. %, and wherein the coating composition comprises from 7 to 18 wt. % of at least one coupling polymer based on a phosphoric acid partial ester; and
wherein the metallic surface is cleaned or pickled before application of the composition.

3. The process according to claim 2, wherein the at least one cationically or radically polymerizable monomer or oligomer is selected from the group consisting of an acrylate, a methacrylate, a polyester and a polyurethane.

4. The process according to claim 1, wherein the at least one cationically or radically polymerizable monomer or oligomer is selected from the group consisting of butanediol diacrylate, diethylene glycol diacrylate, dipropylene glycol diacrylate, 2-ethylhexyl acrylate, hexanediol dicyl acrylate, hydroxypropyl methacrylate, isobornyl acrylate, isobornyl methacrylate, polyethylene diacrylate, triethylol propane formal acrylate, trimethyl propane triacrylate, trimethylol propane formal acrylate, triethylol propane acrylate, trimethylol propane acrylate and tripropylene glycol diacrylate.

5. The process according to claim 1, wherein at least one flexibilizing resin or at least one modified flexibilizing resin is additionally added to the anticorrosive composition.

6. The process according to claim 2, wherein at least one flexibilizing resin or at least one modified flexibilizing resin is additionally added to the anticorrosive composition.

7. The process according to claim 1, wherein at least one base polymer based on acrylate, epoxide, methacrylate, polyester, polyurethane or/and copolymers thereof is added to the anticorrosive composition.

8. The process according to claim 2, wherein at least one base polymer based on acrylate, epoxide, methacrylate, polyester, polyurethane or copolymers thereof is added to the anticorrosive composition.

9. The process according to claim 1, wherein the dispersion or solution of at least one photoinitiator is added to the anticorrosive composition, based on compounds selected from the group consisting of amino ketones, benzoin ethers, benzophenones, dimethyl ketals, glyoxylates, hydroxyketones, hydroxyphenones, isopropyl ethers, metallocenes, organic iodine compounds, phenyl ketones, phenyl propanes, phosphine oxides and derivatives thereof, in order to allow a cationic or radical cure.

10. The process according to claim 2, wherein the dispersion or solution of at least one photoinitiator is added to the anticorrosive composition, based on compounds selected from the group consisting of amino ketones, benzoin ethers, benzophenones, dimethyl ketals, glyoxylates, hydroxyketones, hydroxyphenones, isopropyl ethers, metallocenes, organic iodine compounds, phenyl ketones, phenyl propanes, phosphine oxides and derivatives thereof, in order to allow an anionic, cationic or radical cure.

11. The process according to claim 1, wherein at least one crosslinking agent is added to the anticorrosive composition, based on isocyanate, isocyanurate, melamine resin or compounds which can release isocyanate or isocyanurate at elevated temperature, in order to allow a chemical postcure.

12. The process according to claim 2, wherein at least one crosslinking agent is added to the anticorrosive composition, based on isocyanate, isocyanurate, melamine resin or compounds which can release isocyanate or isocyanurate at elevated temperature, in order to allow a chemical postcure.

13. The process according to claim 1, wherein the first organic corrosion inhibitor is selected from the group of compounds based on amines, thiols and conductive polymers as well as a dicarboxylic acid.

14. The process according to claim 2, wherein the first organic corrosion inhibitor is selected from the group of compounds based on amines, thiols and conductive polymers as well as a dicarboxylic acid.

15. The process according to claim 1, wherein at least one further organic or inorganic corrosion inhibitor is added to the anticorrosive composition, selected from the group based on anticorrosive pigments and compounds of titanium, hafnium, zirconium, carbonate, ammonium carbonate, amines, amine derivatives, derivatives of an organic acid, thiols or conductive polymers.

16. The process according to claim 2, wherein a corrosion inhibitor is added to the anticorrosive composition in a ratio of organic to inorganic corrosion inhibitors in the range from 1:8 to 1:20.

17. The process according to claim 1, wherein at least one further additive is selected from the group consisting of at least one wetting agent, defoaming agent, lubricant, bonding agent, pigments, flow control agents, agents to increase reactivity, surface additives to increase scratch resistance, thixotropic auxiliary agents and wetting agents.

18. The process according to claim 2, further comprising at least one additive is selected from the group consisting of at least one wetting agent, defoaming agent, lubricant, bonding agent, pigments, flow control agents, agents to increase reactivity, surface additives to increase scratch resistance and auxiliary agents.

19. The process according to claim 1, wherein the anticorrosive composition contains at least one lubricant selected from the group of compounds based on graphite, polyethylene, polypropylene, polytetrafluoroethylene, silane, siloxane and wax.

20. The process according to claim 2, wherein the anticorrosive composition contains at least one lubricant selected from the group of compounds based on graphite, polyethylene, polypropylene, polytetrafluoroethylene, silane, siloxane and wax.

21. The process according to claim 1, wherein the anticorrosive composition contains at least one pigment selected from the group of compounds based on colored pigment, metal pigment, oxide, phosphate, phosphide, phosphosilicate, silicate, and coated pigment and from the group consisting of aluminum, aluminum alloys, iron alloys, iron hydroxide, iron oxide, iron phosphate, iron phosphide, graphite, silica, modified silica, optionally modified aluminum silicate, alkaline earth silicate or alumosilicate, hypostoichiometric electrically conductive oxide, carbon black, zinc, aluminum-containing alloy and zinc-containing alloy.

22. The process according to claim 2, wherein the anticorrosive composition contains as additive at least one pigment selected from the group of compounds based on colored pigment, metal pigment, oxide, phosphate, phosphide, phosphosilicate, silicate, electrically conductive pigment and coated pigment and selected from the group consisting of aluminum, aluminum alloys, iron alloys, iron hydroxide, iron oxide, iron phosphate, iron phosphide, graphite, silica, modified silica, optionally modified aluminum silicate, alkaline earth silicate or alumosilicate, hypostoichiometric electrically conductive oxide, carbon black, zinc, aluminum-containing alloy and zinc-containing alloy.

23. The process according to claim 1, wherein on application the anticorrosive coating displays a viscosity in the range from 80 to 20000 mPa·s, measured at a temperature of 25° C. with a Haake VT 500 rotational viscometer with an MV DIN measuring cylinder in accordance with DIN 53019.

24. The process according to claim 2, wherein on application the anticorrosive coating displays a viscosity in the range from 80 to 20000 mPa·s, measured at a temperature of 25° C. with a Haake VT 500 rotational viscometer with an MV DIN measuring cylinder in accordance with DIN 53019.

25. The process according to claim 1, wherein on application the anticorrosive composition has a temperature in the range from 5 to 90° C.

26. The process according to claim 2, wherein on application the anticorrosive composition has a temperature in the range from 5 to 90° C.

27. The process according to claim 1, wherein the anticorrosive composition is applied to the metallic surface by pouring without or with a knife, spraying, atomisation, dipping or rolling.

28. The process according to claim 2, wherein the anticorrosive composition is applied to the metallic surface by pouring without or with a knife, spraying, atomisation, dipping or rolling.

29. The process according to claim 1, wherein surfaces consisting of aluminum, aluminum-containing alloys, chromium, chromium alloys, magnesium alloys, stainless steel, steel, zinc, zinc-containing alloys, tin or tin-containing alloys are coated.

30. The process according to claim 2, wherein surfaces consisting of aluminum, aluminum-containing alloys, chromium, chromium alloys, magnesium alloys, stainless steel, steel, zinc, zinc-containing alloys, tin or tin-containing alloys are coated.

31. The process according to claim 1, wherein the wet film of the anticorrosive composition is dried at temperatures in the range from 30 to 95° C.

32. The process according to claim 2, wherein the wet film of the anticorrosive composition is dried at temperatures in the range from 30 to 95° C.

33. The process according to claim 1, wherein the largely or completely dry film of the anticorrosive composition is irradiated with UV radiation, and is partially, largely or completely crosslinked via the irradiation.

34. The process according to claim 2, wherein the largely or completely dry film of the anticorrosive composition is irradiated with UV radiation, and is partially, largely or completely crosslinked via the irradiation.

35. The process according to claim 1, wherein the number and type of double bonds of the monomers, oligomers or polymers and the content of monomers, oligomers or polymers, and the duration, intensity and wavelength of the UV radiation are selected in such a way that a polymeric network having a medium-sized distance between crosslinking points is formed which at the same time has high flexibility and high chemical resistance.

36. The process according to claim 2, wherein the number and type of double bonds of the monomers, oligomers or polymers and the content of monomers, oligomers or polymers, and based on the duration, intensity and wavelength of the UV radiation are selected in such a way that a polymeric network having a medium-sized distance between crosslinking points is formed which at the same time has high flexibility and high chemical resistance.

37. The process according to claim 1, wherein the anticorrosive composition and the cationically or radically cured dry film produced therewith contains at least one hardener, such that the dry film, optionally after being heated to at least 60° C., is chemically postcured.

38. The process according to claim 2, wherein the anticorrosive composition and the cationically or radically cured dry film produced therewith contains at least one hardener, such that the dry film, optionally after being heated to at least 60° C., is chemically postcured.

39. The process according to claim 1, wherein the substrate coated with the anticorrosive coating can be coated with at least one further lacquer, paint or adhesive.

40. The process according to claim 2, wherein the substrate coated with the anticorrosive coating can be coated with at least one further lacquer, paint or adhesive.

41. The process according to claim 1, wherein the anticorrosive coating applied to the metallic body is formed with the substrate, wherein the anticorrosive coating remains largely or entirely undamaged.

42. The process according to claim 2, wherein the anticorrosive coating applied to the metallic body is formed with the substrate, wherein the anticorrosive coating remains largely or entirely undamaged.

43. The process according to claim 1, wherein the formed substrate in the form of a formed, cut or stamped metal sheet coated with the anticorrosive coating is joined to another construction element by clinching, gluing, welding or at least one other joining process.

44. The process according to claim 2, wherein the formed substrate in the form of a formed, cut or stamped metal sheet coated with the anticorrosive coating is joined to another construction element by clinching, gluing, welding or at least one other joining process.

45. The process according to claim 1, wherein the solution or dispersion is applied to a metallic strip carried on a conveyor belt system.

46. The process according to claim 2, wherein the solution or dispersion is applied to a metallic strip carried on a conveyor belt system.

47. The process according to claim 2, wherein at least one organic or inorganic corrosion inhibitor is added to the anticorrosive composition, selected from the group based on anticorrosive pigments and compounds of titanium, hafnium, zirconium, carbonate, ammonium carbonate, amines, an organic acid, thiols or conductive polymers.

48. A process for coating a metallic surface of a metallic substrate comprising applying, an organic, cationically or radically curable anticorrosive composition, to the metallic surface, and curing the applied composition with electron beam radiation, wherein said anticorrosive composition consists of a dispersion or solution containing at least two components that are at least partially cationically or radically curable, the at least two components selected from the group consisting of a monomer, an oligomer and a polymer with a total content in the range from 60 to 92 wt. %, the polymer being based on at least one polyester urethane acrylate, at least one modified polyester urethane acrylate or at least one aliphatic urethane acrylate, wherein at least one monomer or oligomer is present in an amount of from 10 to 50 wt. %, of which at least 12 wt. % are isobornyl acrylate, isobornyl methacrylate or a mixture thereof;

from 0.1 to 3 wt. % of a first organic corrosion inhibitor, from 7 to 18 wt. % of at least one coupling polymer based on a phosphoric acid partial ester, and water or at least one organic solvent in a total content of 0.01 to 5 wt. %, relative in each case to the solids contents in wt. %, wherein the anticorrosive composition is applied to the metallic surface in a wet film thickness in the range from 0.4 to 25 µm; and at least one of cationically radically or UV curing the composition to form an anticorrosive coating, wherein the cured anticorrosive coating has a dry film thickness in the range from 0.4 to 20 µm and a chemical resistance of over 50 MEK cycles, determined in the MEK test in accordance with ECCA standard T11 with methyl ethyl ketone wherein the coating has a chemical resistance of at least 40 MEK cycles, wherein the metallic surfaces are zinc or zinc alloy coated steel and are coated at a belt speed of from 80 to 220 m per minute;

wherein if the corrosion inhibitor is an anticorrosive pigment, the amount of the anticorrosive pigment ranges from 0.1 to 8 wt. %; and wherein the metallic surface is cleaned or pickled before application of the composition.

49. A process for coating a metallic surface of a metallic substrate comprising applying an organic, cationically or radically curable anticorrosive composition, without applying a pretreatment coat prior to applying the anticorrosive composition, wherein the anticorrosive composition consists of a dispersion or solution which is applied directly to the metallic surface in a wet film thickness in the range from 0.4 to 25 μm, is optionally dried and is then cationically or radically cured to form an anticorrosive coating which displays a dry film thickness in the range from 0.4 to 20 m, wherein the anticorrosive coating achieves a flexibility and bond strength of less than or equal to T3, determined by means of a T-bend test in accordance with ECCA standard T7 on hot-galvanised precoated steel sheets of 0.3 mm thickness organically coated in a film thickness of 8 μm, wherein the coating has a chemical resistance of at least 40 MEK cycles, wherein the metallic surfaces are zinc or zinc alloy coated steel and are coated at belt speed of from 80 to 220 m per minute;

wherein the coating composition comprises from 7 to 18 wt. % at least one coupling polymer based on a phosphoric acid partial ester; and wherein the metallic surface is cleaned or pickled before application of the composition.

50. The process of claim 2, wherein the composition comprises 30 to 44 wt. % of a mixture of isobornylacrylate and isobornylmethacrylate.

51. The process of claim 1, wherein the composition comprises 30 to 44 wt. % of a mixture of isobornylacrylate and isobornylmethacrylate.

52. The process of claim 1, wherein the composition includes 24 to 33 wt. % of urethane acrylate polyester as the polymer.

53. The process of claim 2, wherein the composition includes 24 to 33 wt. % of urethane acrylate polyester as the polymer.

54. The process of claim 1, wherein 30 to 44 wt. % of the monofunctional monomer is a mixture of isobornylacrylate and isobornylmethacrylate.

55. The process of claim 2, wherein 30 to 44 wt. % of the monofunctional monomer is a mixture of isobornylacrylate and isobornylmethacrylate.

56. The process of claim 1, wherein the first organic corrosion inhibitor is selected from the group consisting of compounds based on amines, compounds based on derivatives of an organic acid, compounds based on thiols and conductive polymers, compounds based on succinic acid derivatives, compounds based on ethyl morpholine derivatives, compounds based on polyamine fatty acid derivatives and compounds based on triazole derivatives.

57. The process of claim 1, wherein the first organic corrosion inhibitor is at least an alkanolamine, at least a conductive polymer, or at least a thiol.

58. The process of claim 57, wherein the alkanolamine is a long-chain alkanolamine.

59. The process of claim 57, wherein the conductive polymer is based on polyaniline.

60. The process of claim 56, wherein the organic acid derivative is a dicarboxylic acid derivative.

61. The process of claim 48, wherein the composition further comprises at least one organic or inorganic corrosion inhibitor with a total content in the range from 0.1 to 12 wt. %.

62. The process of claim 1, wherein the composition contains at least one polyester acrylate.

63. The process of claim 1, without the interposition of a pretreatment coat on the metallic surface.

64. A process for coating a metallic surface of a metallic substrate comprising applying, an organic, cationically or radically curable anticorrosive composition to the metallic surface, wherein said anticorrosive composition comprises a dispersion or solution containing at least two components that are at least partially cationically or radically curable, wherein the at least two components are selected from the group consisting of a monomer, an oligomer and a polymer with a total content in the range from 60 to 92 wt. %, the polymer is only based on at least one polyester urethane acrylate, at least one modified polyester urethane acrylate or at least one aliphatic urethane acrylate, wherein at least one monomer or oligomer is present in an amount of from 10 to 50 wt. %, of which at least 12 wt. % are isobornyl acrylates, isobornyl methacrylate or a mixture thereof;

from 2 to 18 wt. % of at least one photoinitiator for at least one of cationic or radical crosslinking if electron beam radiation is not used, from 0.1 to 3 wt. % of a first organic corrosion inhibitor, from 1.5 to 30 wt. of an additive, and from 7 to 18 wt. % of at least one coupling polymer based on a phosphoric acid partial ester, and at least one of water or an organic solvent in a total content of 0.01 to 5 wt. %, relative in each case to the solids contents in wt. %, wherein the anticorrosive composition is applied to the metallic surfaces in a wet film thickness in the range from 0.4 to 25 μm; and at least one of cationically, or radically curing the composition to form an anticorrosive coating on the metal surface, wherein the anticorrosive coating has a dry film thickness in the range from 0.4 to 20 μm and a chemical resistance of over 50 MEK cycles, determined in the MEK test in accordance with ECCA standard T11 with methyl ethyl ketone wherein the coating has a chemical resistance of at least 40 MEK cycles, wherein the metallic substrate is coated at a belt speed of from 80 to 220 m per minute;

wherein if the corrosion inhibitor is an anticorrosive pigment, the amount of the anticorrosive pigment ranges from 0.1 to 8 wt. %; and wherein the metallic surface is cleaned or pickled before application of the composition.

65. The process of claim 64, wherein isobornyl compounds are present in an amount of from 18-40 wt. %.

66. The process of claim 65, wherein the photoinitiator is present in an amount of from 4 to 14 wt. %.

67. The process of claim 66, where the first organic corrosion inhibitor is present in an amount of from 0.1 to 1.5 wt. %.

68. The process of claim 67, wherein the anticorrosive pigment is present in an amount of from 1 to 7 wt. %.

69. The process of claim 68, wherein the coupling polymer further comprises a polymer based on a member selected from the group consisting of an acrylate, an epoxide, a methacrylate, a polyester and a polyurethane.

70. A process for coating a metallic surface of a metallic substrate comprising applying, an organic, cationically or radically curable anticorrosive composition to the metallic surface, wherein said anticorrosive composition comprises:
- 28 to 36 wt. % of a base polymer wherein the base polymer is based on at least one member selected from the group consisting of a polyester urethane acrylate, a modified polyester urethane acrylate, an aliphatic urethane acrylate and an aromatic epoxide acrylate;
- from 32 to 43.5 wt. % of an isobornyl compound;
- from 4 to 14 wt. % of a photoinitiator;
- from 0.1 to 5 wt. % of a first organic corrosion inhibitor;
- from 1 to 8 wt. % of an anticorrosive pigments;
- from 7 to 18 wt. % of a coupling polymer based on a phosphoric acid partial ester
- wherein the metallic surface of the metallic substrate comprises at least one member selected from the group consisting of stainless steel, a steel, zinc and a zinc-containing alloy; and
- wherein the metallic surface is cleaned or pickled before application of the composition.

71. The process of claim 64, wherein the base polymer is based on a member selected from the group consisting of a polyester urethane acrylate, a modified polyester urethane acrylate and an aliphatic urethane acrylate.

72. The process of claim 70, wherein the base polymer is based on a member selected from the group consisting of a polyester urethane acrylate, a modified polyester urethane acrylate and an aliphatic urethane acrylate.

73. The process of claim 64, wherein the composition further comprises from 3 to 12 wt. % of members selected from the group consisting of a postcuring compound and a hardener.

74. The process of claim 70, wherein the composition further comprises from 3 to 12 wt. % of members selected from the group consisting of a postcuring compound and a hardener.

75. The process of claim 70, wherein the base polymer is only based on a polyester urethane acrylate, at least one modified polyester urethane acrylate or at least one aliphatic urethane acrylate.

* * * * *

UNITED STATES PATENT AND TRADEMARK OFFICE
CERTIFICATE OF CORRECTION

PATENT NO.         : 9,695,322 B2                                                        Page 1 of 1
APPLICATION NO.    : 13/344642
DATED              : July 4, 2017
INVENTOR(S)        : Georg Gros, Stefan Waidelich and Norbert Maurus It is certified that error appears in the above-identified patent and that said Letters Patent is hereby corrected as shown below:

In the Claims

Claim 49, Line 16, reads "displays a dry film thickness in the range from 0.4 to 20 m," should read -- displays a dry film thickness in the range from 0.4 to 20 µm," --.

Claim 64, Line 29, reads "from 1.5 to 30 wt. of an additive, and" should read -- from 1.5 to 30 wt.% of an additive, and --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*